(12) United States Patent
Sutherland

(10) Patent No.: US 11,726,387 B2
(45) Date of Patent: Aug. 15, 2023

(54) TRAPPED-ION ENTANGLING GATES WITH BICHROMATIC PAIR OF MICROWAVE FIELDS AND MAGNETIC FIELD GRADIENT

(71) Applicant: Lawrence Livermore National Security, LLC, Livermore, CA (US)

(72) Inventor: Robert Tyler Sutherland, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 669 days.

(21) Appl. No.: 16/783,875

(22) Filed: Feb. 6, 2020

(65) Prior Publication Data

US 2021/0116784 A1     Apr. 22, 2021

Related U.S. Application Data

(60) Provisional application No. 62/924,628, filed on Oct. 22, 2019.

(51) Int. Cl.
*G02F 3/00* (2006.01)
*G06N 10/00* (2022.01)

(52) U.S. Cl.
CPC .............. *G02F 3/00* (2013.01); *G06N 10/00* (2019.01)

(58) Field of Classification Search
CPC ................................. G02F 3/00; G06N 10/00
See application file for complete search history.

(56) References Cited

PUBLICATIONS

Weidt et al.; Trapped-Ion Quantum Logic with Global Radiation Fields; Physics Rev. Lett. 117, 220501 (2016) (Year: 2016).*
Lekitsch et al.; Blueprint fora microwave trapped ion quantum computer; Sci. Adv. 3: e1601540 (Year: 2017).*
Ballance et al., "High-Fidelity Quantum Logic Gates Using Trapped-Ion Hyperfine Qubits," Physical Review Letters, week ending Aug. 5, 2016, pp. 060504-1-060504-6, vol. 117.
Bermudez et al., "Robust trapped-ion quantum logic gates by continuous dynamical decoupling," Physical Review A, (2012), pp. 040302-1-040302-5, vol. 85.
Biercuk et al., "Experimental Uhrig dynamical decoupling using trapped ions," Physical Review A, (2009), pp. 062324-1-062324-12, vol. 79.

(Continued)

*Primary Examiner* — Syed I Gheyas
(74) *Attorney, Agent, or Firm* — Knobbe, Martens, Olson & Bear, LLP

(57) ABSTRACT

A trapped-ion quantum logic gate and a method of operating the trapped-ion quantum logic gate are provided. The trapped-ion quantum logic gate includes at least one ion having two internal states and forming a qubit having a qubit transition frequency $\omega_0$, a magnetic field gradient, and two microwave fields. Each of the two microwave fields has a respective frequency that is detuned from the qubit transition frequency $\omega_0$ by frequency difference $\delta$. The at least one ion has a Rabi frequency $\Omega_\mu$ due to the two microwave fields and a Rabi frequency $\Omega_g$ due to the magnetic field gradient. The method includes applying the magnetic field gradient and the two microwave fields to the at least one ion such that a quantity $\Omega_g/\delta$ is in a range between zero and $5\times10^{-2}$.

19 Claims, 10 Drawing Sheets

(56) References Cited

PUBLICATIONS

Blatt et al., "Entangled states of trapped atomic ions," Nature, Jun. 19, 2008, pp. 1008-1015, vol. 453.
Chiaverini et al., "Laserless trapped-ion quantum simulations without spontaneous scattering using microtrap arrays," Physical Review A, (2008), pp. 022324-1-022324-11, vol. 77.
Cirac et al., "Quantum Computations with Cold Trapped Ions," Physical Review Letters, May 15, 1995, pp. 4091-4094, vol. 74, No. 20.
Ding et al., "Microwave Control of Trapped-Ion Motion Assisted by a Running Optical Lattice," Physical Review Letters, week ending Aug. 15, 2014, pp. 073002-1-073002-5, vol. 113.
Gaebler et al., "High-Fidelity Universal Gate Set for $^9Be^+$Ion Qubits," Physical Review Letters, week ending Aug. 5, 2016, pp. 060505-1-060505-5, vol. 117.
Green et al., "Phase-Modulated Decoupling and Error Suppression in Qubit-Oscillator Systems," Physical Review Letters, week ending Mar. 27, 2015, pp. 120502-1-120502-5, vol. 114.
Haddadfarshi et al., High fidelity quantum gates of trapped ions in the presence of motional heating, New Journal of Physics, (2016), in 10 pages, vol. 18.
Häffner et al., "Quantum computing with trapped ions," Physics Reports, Sep. 2008, pp. 155-203, vol. 469.
Hahn et al., "Integrated $^9B^+$multi-qubit gate device for the ion-trap quantum computer," New J. Phys. Quantum Information, (2019), in 5 pages, vol. 70.
Harty et al., "High-Fidelity Preparation, Gates, Memory, and Readout of a Trapped-Ion Quantum Bit," Physical Review Letters, week ending Nov. 28, 2014, pp. 220501-1-220501-5, vol. 113.
Harty et al., "High-Fidelity Trapped-Ion Quantum Logic Using Near-Field Microwaves," Physical Review Letters, week ending Sep. 20, 2016, pp. 140501-1-140501-6, vol. 117.
Hayes et al., "Coherent Error Suppression in Multiqubit Entangling Gates," Physical Review Letters, week ending Jul. 13, 2012, pp. 020503-1-020503-5, vol. 109.
Johanning et al., "Individual Addressing of Trapped Ions and Coupling of Motional and Spin States Using rf Radiation," Physical Review Letters, week ending Feb. 20, 2009, pp. 073004-1-073004-4, vol. 102.
Khromova et al., "Designer Spin Pseudomolecule Implemented with Trapped Ions in a Magnetic Gradient," Physical Review Letters, week ending Jun. 1, 2012, pp. 220502-1-220502-5, vol. 108.
Ladd et al., "Quantum computers," Nature, Mar. 4, 2010, pp. 45-53, vol. 464.
Lake et al., "Generation of spin-motion entanglement in a trapped ion using long-wavelength radiation," Physical Review A, (2015), pp. 012319-1-012319-5, vol. 91.
Leibfried et al., "Experimental demonstration of a robust, high-fidelity geometric two ion-qubit phase gate," Nature, Mar. 2003, pp. 412-415, vol. 422.
Leibfried et al., "Transport quantum logic gates for trapped ions," Physical Review A, (2007), pp. 032324-1-032324-12, vol. 76.
Leung et al., "Robust 2-Qubit Gates in a Linear Ion Crystal Using a Frequency-Modulated Driving Force," Physical Review Letters, (2018), pp. 020501-1-020501-4, vol. 120.
Manovitz et al., "Fast Dynamical Decoupling of the Mølmer-Sørenson Entangling Gate," Physical Review Letters, week ending Dec. 1, 2017, pp. 220505-1-220505-6, vol. 119.
Milburn et al., "Ion Trap Quantum Computing with Warm Ions," Fortschr. Phys., (2000), pp. 801-810, vol. 48.
Mintert et al., "Ion-Trap Quantum Logic Using Long-Wavelength Radiation," Physical Review Letters, Dec. 17, 2001, pp. 257904-1-257904-4, vol. 87, No. 25.
Monroe et al., "Demonstration of a Fundamental Quantum Logic Gate," Physical Review Letters, Dec. 18, 1995, pp. 4714-4718, vol. 75, No. 25.

Ospelkaus et al., "Trapped-Ion Quantum Logic Gates Based on Oscillating Magnetic Fields," Physical Review Letters, week ending Aug. 29, 2008, pp. 090502-1-090502-4, vol. 101.
Ospelkaus et al., "Microwave quantum logic gates for trapped ions," Nature, Aug. 11, 2011, pp. 181-185, vol. 476.
Ozeri et al., "Errors in trapped-ion quantum gates due to spontaneous photon scattering," Physical Review A, (2007), pp. 042329-1-042329-14, vol. 75.
Piltz et al., "Protecting Conditional Quantum Gates by Robust Dynamical Decoupling," Physical Review Letters, week ending May 17, 2013, pp. 200501-1-200501-5, vol. 110.
Randall et al., "Efficient preparation and detection of microwave dressed-state qubits and qutrits with trapped ions," Physical Review A, (2015), pp. 012322-1-012322-7, vol. 91.
Roos, Christian F., "Ion trap quantum gates with amplitude-modulated laser beams," New Journal of Physics, (2008), pp. 1-20, vol. 10.
Shapira et al., "Robust Entanglement Gates for Trapped-Ion Qubits," Physical Review Letters, (2018), pp. 180502-1-180502-6, vol. 121.
Solano et al., "Deterministic Bell states and measurement of the motional state of two trapped ions," Physical Review A Atomic, Molecular, and Optical Physics Rapid Communications, Apr. 1999, pp. R2539-R2543, Third Series, vol. 59, No. 4.
Sørensen et al., "Quantum Computation with Ions in Thermal Motion", Physical Review Letters, Mar. 1, 1999, pp. 1971-1974, vol. 82, No. 9.
Sørensen et al., "Entanglement and quantum computation with ions in thermal motion," Physical Review A, (2000), pp. 022311-1-022311-11, vol. 62.
Srinivas et al., "Trapped-Ion Spin-Motion Coupling with Microwaves and a Near-Motional Oscillating Magnetic Field Gradient," Physical Review Letters, (2019), pp. 163201-1-163201-6, vol. 122.
Sutherland et al., "Versatile laser-free trapped-ion entangling gates," New Journal of Physics, (2019), in 12 pages, vol. 21.
Tan et al., "Demonstration of a Dressed-State Phase Gate for Trapped Ions," Physical Review Letters, week ending Jun. 28, 2013, pp. 263002-1-263002-5, vol. 110.
Timoney et al., "Quantum gates and memory using microwave-dressed states," Nature, Aug. 11, 2011, pp. 185-189, vol. 476.
Uhrig, Gotz S., "Keeping a Quantum Bit Alive by Optimized π-Pulse Sequences," Physical Review Letters, week ending Mar. 9, 2007, pp. 100504-1-100504-4, vol. 98.
Viola et al., "Dynamical suppression of decoherence in two-state quantum systems," Physical Review A, Oct. 1998, pp. 2733-2744, vol. 58, No. 4.
Viola et al., "Dynamical Decoupling of Open Quantum Systems," Physical Review Letters, Mar. 22, 1999, pp. 2417-2421, vol. 82, No. 12.
Webb et al., "Resilient Entangling Gates for Trapped Ions," Physical Review Letters, (2018), pp. 180501-1-180501-6, vol. 121.
Weidt et al., "Trapped-Ion Quantum Logic with Global Radiation Fields," Physical Review Letters, week ending Nov. 25, 2016, pp. 220501-1-220501-6, vol. 117.
Welzel et al., "Spin and motion dynamics with zigzag ion crystals in transverse magnetic field gradients," Journal of Physics B: Atomic, Molecular, and Optical Physics, Dec. 14, 2018, pp. 1-6, vol. 52, No. 2.
Wineland et al., "Experimental Issues in Coherent Quantum-State Manipulation of Trapped Atomic Ions," Journal of Research of the National Institute of Standards and Technology, May-Jun. 1998, pp. 259-328, vol. 103, No. 3.
Wölk et al., "Quantum dynamics of trapped ions in a dynamic field gradient using dressed states," New Journal of Physics, (2017), in 13 pages, vol. 19.
Zarantonello et al., "Robust and Resource-Efficient Microwave Near-Field Entangling $^9Be^+$Gate," Physical Review Letters, (2019), pp. 260503-1-260503-6, vol. 123.

\* cited by examiner

TRAPPED-ION ENTANGLING GATES WITH BICHROMATIC PAIR OF MICROWAVE FIELDS AND MAGNETIC FIELD GRADIENT

CLAIM OF PRIORITY

This application claims the benefit of priority to U.S. Provisional Appl. No. 62/924,628, filed on Oct. 22, 2019 and incorporated in its entirety by reference herein.

STATEMENT REGARDING FEDERALLY SPONSORED R&D

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field

This application relates to quantum information devices utilizing trapped ions as qubits.

Description of the Related Art

Due to their inherent uniformity and exceptional coherence properties, trapped ions are a promising platform for scalable quantum simulations and general purpose quantum computing (see, e.g., Cirac 1995: *Phys. Rev. Lett.* 74 4091; Monroe 1995: *Phys. Rev. Lett.* 75 4714; Nielsen 2010: *Quantum computation and quantum information* (Cambridge University Press); Haffner 2008: *Phys. Rep.* 469 155; Blatt 2008: *Nature* 453 1008; Ladd 2010: *Nature* 464 45; Harty 2014: *Phys. Rev. Lett.* 113, 220501). Quantum entanglement, a necessary component of these two applications, is created in the ions' internal degrees of freedom (e.g., qubit "spin" states) via coupling to shared motional degrees of freedom (e.g., motional modes) (see, e.g., Wineland 1998: *J. Res. Natl. Inst. Stand. and Technol.* 103, 259). This spin-motion coupling can be achieved with one or more spatially dependent electromagnetic fields. One challenge for trapped-ion quantum logic is obtaining robust, scalable methods for spin-motion coupling with minimal error.

Geometric phase gates, which create entanglement through closed spin-dependent trajectories in motional phase space, are widely used because (in the Lamb-Dicke limit) they are first-order insensitive to ion temperature (see, e.g., Mølmer 1999: *Phys. Rev. Lett.* 82 1835; Sørensen 2000: *Phys. Rev. A* 62 022311; Leibfried 2003: *Nature* 422 412). Geometric phase gates employing laser beams and hyperfine qubits to create the spin-motion coupling have been used to generate Bell states with fidelities ~0.999 (see, e.g., Ballance 2016: *Phys. Rev. Lett.* 117 060504; Gaebler 2016: *Phys. Rev. Lett.* 117 060505). In such laser-based schemes, two interfering non-copropagating laser beams create a moving optical lattice, whose state-dependent force couples the ions' internal degrees of freedom to their shared motion. The reported dominant errors were due to off-resonant photon scattering (see, e.g., Ozeri 2007: *Phys. Rev. A* 75 042329).

SUMMARY

In certain implementations, a method of operating a trapped-ion quantum logic gate is provided. The method comprises providing a trapped-ion quantum logic gate, the gate comprising at least one ion having two internal states and forming a qubit having a qubit transition frequency $\omega_0$, a magnetic field gradient, and two microwave fields. Each of the two microwave fields has a respective frequency that is detuned from the qubit transition frequency $\omega_0$ by frequency difference $\delta$. The at least one ion has a Rabi frequency $\Omega_\mu$ due to the two microwave fields and a Rabi frequency $\Omega_g$ due to the magnetic field gradient. The method further comprises applying the magnetic field gradient and the two microwave fields to the at least one ion such that a quantity $\Omega_g/\delta$ is in a range between zero and $5 \times 10^{-2}$.

In certain implementations, a trapped-ion quantum logic gate is provided. The gate comprises at least one ion having two internal states and forming a qubit having a qubit transition frequency $\omega_0$. The gate further comprises a magnetic field gradient, and two microwave fields. Each of the two microwave fields has a respective frequency that is detuned from the qubit transition frequency $\omega_0$ by frequency difference $\delta$. The at least one ion has a Rabi frequency $\Omega_\mu$ due to the two microwave fields and a Rabi frequency $\Omega_g$ due to the magnetic field gradient. The magnetic field gradient and the two microwave fields are configured such that a quantity $\Omega_g/\delta$ is in a range between zero and $5 \times 10^{-2}$.

In certain implementations, an intrinsic dynamically decoupled microwave-based zz ("IDD ZZ") entangling gate is provided. The IDD ZZ gate is configured to be insensitive to qubit frequency shifts automatically. The IDD ZZ gate comprises trapped ions, a magnetic field gradient, and two microwave fields. The IDD ZZ gate does not require added fields to dynamically decouple itself from noise sources or to align the trapped ions. The IDD ZZ gate is configured to commute with static errors caused by miscalibrations and to use the two microwave fields to perform dynamical decoupling.

In certain implementations, a method of intrinsic dynamically decoupled microwave-based zz ("IDD ZZ") trapped-ion entangling gating is provided. The method is insensitive to qubit frequency shifts automatically. The IDD ZZ gate comprises trapped ions, a magnetic field gradient, and two microwave fields. The IDD ZZ gate does not require added fields to dynamically decouple itself from noise sources or to align the trapped ions. The IDD ZZ gate is configured to commute with static errors caused by miscalibrations and to use the two microwave fields to perform dynamical decoupling.

DETAILED DESCRIPTION

Overview

Figure 1:
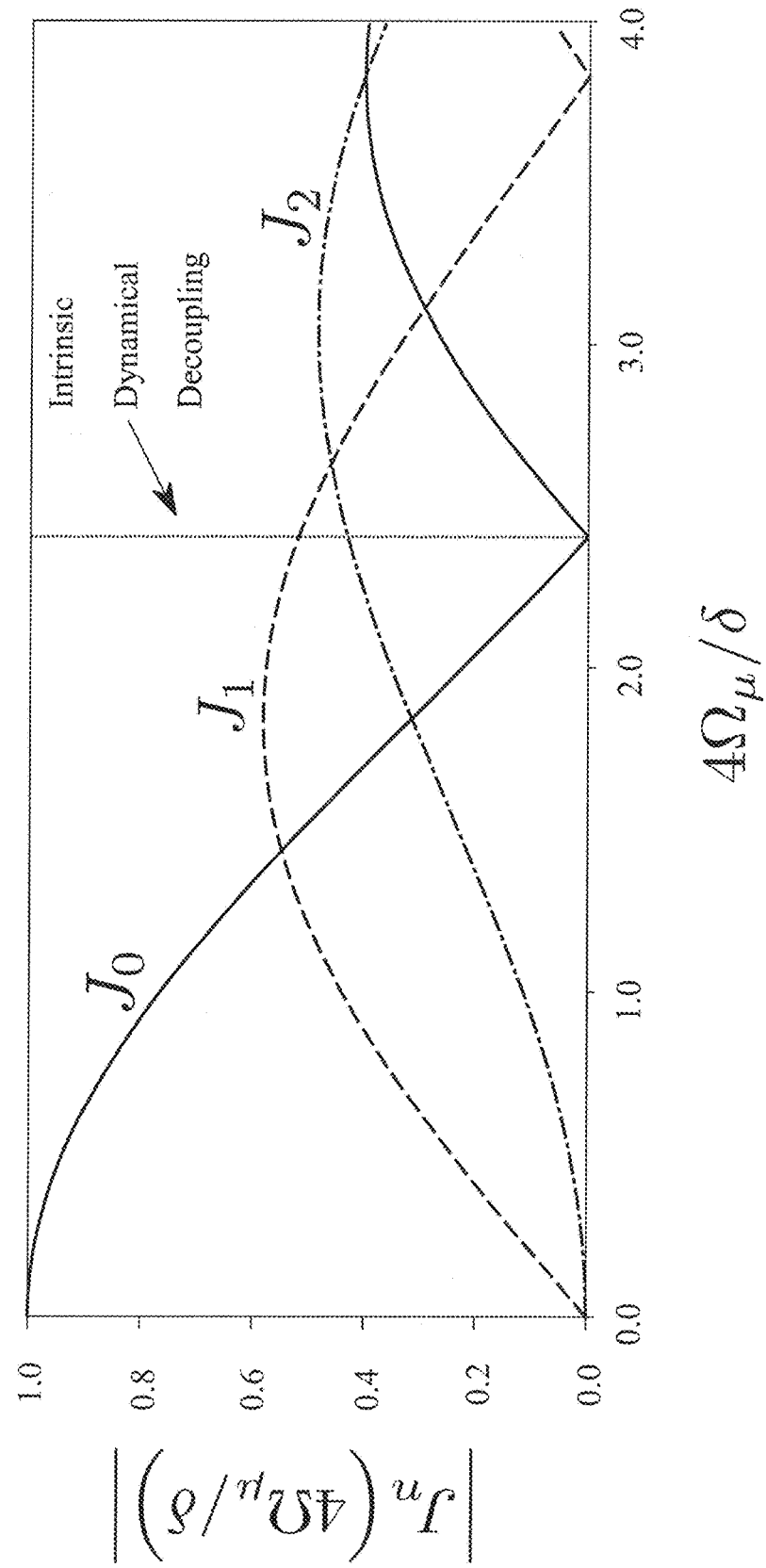
FIG. 1 is a plot of the relative strengths of the gate Rabi frequencies corresponding to the first three resonances versus $4\Omega_\mu/\delta$ in accordance with certain implementations described herein.

Alternative laser-free schemes use microwaves and induce spin-motion coupling with static magnetic field gradients (see, e.g., Mintert 2001: *Phys. Rev. Lett.* 87 257904; Khromova 2012: *Phys. Rev. Lett.* 108 220502; Lake 2015: *Phys. Rev.* A 91 012319; Randall 2015: *Phys. Rev.* A 91, 012322; Weidt 2016: *Phys. Rev. Lett.* 117 220501; Webb 2018: *Phys. Rev. Lett.* 121, 180501 (2018)), near-qubit-frequency magnetic field gradients (see, e.g., Ospelkaus 2008: *Phys. Rev. Lett.* 101 090502; Ospelkaus 2011: *Nature* 476 181; Harty 2016: *Phys. Rev. Lett.* 117 140501; Wolk 2017: *New J. Phys.* 19 083021; Hahn 2019: *New J. Phys. Quantum Information* 5, 70; Zarantonello 2019: *arXiv preprint arXiv*:1911.03954), or near-motional-frequency magnetic field gradients (see, e.g., Ospelkaus 2008; Chiaverini 2008: *Phys. Rev. A* 77 022324; Sutherland 2019: New J. Phys. 21, 033033; Srinivas 2019: *Phys. Rev. Lett.* 122 163201).

Laser-free schemes are not limited by photon scattering errors, do not require stable, high power lasers, and phase control is significantly easier than in the optical domain. Furthermore, microwave and rf sources are readily scalable to meet the requirements of larger quantum processors.

Such laser-free schemes do have some disadvantages. For example, schemes which employ static magnetic field gradients to perform laser-free gates can provide high-fidelity individual addressing of the ions in frequency space (see, e.g, Johanning 2009: *Phys. Rev. Lett.* 102, 073004), the microwave and rf frequencies used to realize an entangling gate are different for each ion, increasing the total number of drive tones for implementing a gate (see, e.g., Weidt 2016; Webb 2018). In addition, laser-free schemes can be slower than laser-based grates (e.g., by an order of magnitude) so the qubits spend more time entangled with the motional mode, so the gates can be more susceptible to other noise sources.

Qubit frequency shifts or miscalibrations due to fluctuating field amplitudes are significant sources of error in laser-free gates implemented with microwave field gradients (see, e.g., Webb 2018; Ospelkaus 2011). Some of these shifts may be reduced passively through careful trap design (see, Hahn 2019). Recently, a microwave-based Mølmer-Sørenson ($\hat{\sigma}_\phi \otimes \hat{\sigma}_\phi$, where $\hat{\sigma}_\phi \equiv \hat{\sigma}_x \cos\phi + \hat{\sigma}_y \sin\phi$) entangling gate (see, e.g., Mølmer 1999; Sørensen 2000; Roos 2008: *New J. Phys.* 10 013002) was demonstrated with a fidelity of approximately 0.997 (see, Harty 2016). This high-fidelity microwave gate, which utilizes magnetic field gradients oscillating close to the qubit frequency, was achieved using an additional dynamical decoupling field (see, e.g., Viola 1998: *Phys. Rev.* A 58 2733; Viola 1999: *Phys. Rev. Lett.* 82 2417; Bermudez 2012: *Phys. Rev.* A 85 040302; Tan 2013: *Phys. Rev. Lett.* 110 263002) to suppress errors due to qubit frequency fluctuations, a significant source of decoherence in the system. However, the dynamical decoupling demonstrated in Harty 2016 utilized an extra field that is separate from, and commutes with, the gate Hamiltonian, with the precision phase control of an additional field increasing the experimental complexity. While decoherence from secular frequency shifts can be suppressed with Walsh sequences (see, Hayes 2012: *Phys. Rev. Lett.* 109, 020503) or with phase modulation of gate fields [Green 2015: *Phys. Rev. Lett.* 114, 120502; Leung 2018: *Phys. Rev. Lett.* 120, 020501), these techniques increase the gate time $t_G$ in exchange for robustness.

Previously proposed laser-free $\hat{\sigma}_z \otimes \hat{\sigma}_z$ geometric phase gates (see, e.g., Ospelkaus 2008; Leibfried 2007: *Phys. Rev.* A 76 032324) included an oscillating magnetic field gradient close to the ions' motional frequency. These gates are appealing because static qubit frequency shifts commute with the gate and can be canceled with a spin-echo sequence (see, e.g., Milburn 2000: *Fortschr. Phys.* 48 801; Leibfried 2003). However, experimental techniques for generating the gradients usually also result in residual near-resonant electric fields which excite the ion motion and impact gate fidelity (see, Ospelkaus 2008), and these technical challenges limit the implementation of high-fidelity laser-free $\hat{\sigma}_z \otimes \hat{\sigma}_z$ gates.

Previous laser-free trapped-ion quantum logic experiments with oscillating gradients used a pair of near-field microwave gradients, symmetrically detuned about the qubit frequency, to generate the spin-motion coupling used for an entangling gate (see, Ospelkaus 2011; Harty 2016). To reduce off-resonant qubit excitations and ac Zeeman shifts, the microwave magnetic field was minimized at the position of the ions. Recent theoretical work, however, has shown that gates can still be performed in the presence of microwave fields when the qubits are in the dressed state basis with respect to a monochromatic field (see Wolk 2017). In some implementations of geometric phase gates, the microwave field is bichromatic, which complicates analyzing the gate in the dressed-state basis.

As described more fully herein, two-qubit gate dynamics can be derived in the interaction picture with respect to the bichromatic microwave field present in current experimental implementations of geometric phase gates, which is referred to herein as the "bichromatic interaction picture." As described herein, the dynamics in this interaction picture produce the same final state as in the laboratory frame, as long as the bichromatic fields are turned on and off adiabatically. In certain implementations, the gate basis can be chosen to be either $\hat{\sigma}_z \otimes \hat{\sigma}_z$ or $\hat{\sigma}_\phi \otimes \hat{\sigma}_\phi$ simply by changing the detuning of the bichromatic field, and it is possible to dynamically decouple from qubit frequency shifts without adding an extra field. In certain implementations, this technique enables $\hat{\sigma}_z \otimes \hat{\sigma}_z$ gates with all fields far detuned from the ions' motional frequencies.

In certain implementations, the intrinsic dynamically decoupled qubit gates described herein can be applied to any trapped-ion entangling gate that is based on microwaves. Certain implementations advantageously provide high-fidelity microwave-based qubit gates (e.g., ZZ gates) that are insensitive to qubit frequency shifts (e.g., caused by magnetic field noise, misalignment of the ions, etc.), that commutes with static errors caused by various miscalibrations, and/or that uses the fields that create the qubit gate to provide dynamical decoupling. Such qubit gates represent an improvement over previously proposed and performed qubit gates which are not intrinsically insensitive to qubit frequency shifts, that utilize added fields to dynamically decouple the qubit gates from noise sources, and/or that utilize precise alignment of the ions and alignment of the gate fields with such external fields.

In certain implementations, the microwave field Rabi frequency magnitude is of the same order as the motional frequencies of the trapped ions. This regime of large microwave field magnitudes (e.g., $\Omega_\mu \sim \omega_r$) had not previously been investigated or utilized, at least partly because this regime is beyond the peturbative analysis used previously.

In certain implementations, polychromatic gates (e.g., geometric phase gates that comprise multiple simultaneously applied gate fields with optimized amplitudes) advantageously reduce the impact of three types of motional decoherence (e.g., secular frequency shifts, motional heating, and motional dephasing) and have a comparatively smaller trade-off in the gate time $t_G$, with less sensitivity to qubit frequency shifts and without using additional control fields.

Gates in the Bichromatic Interaction Picture

Interaction Picture Dynamics

A Hamiltonian $\hat{H}(t)$, acting on the state $|\psi(t)\rangle$, can be written as consisting of two parts:

$$\hat{H}(t) = \hat{H}_\mu(t) + \hat{H}_g(t) \quad (1)$$

going into the interaction picture with respect to $\hat{H}_\mu(t)$, and $\hat{H}_g(t)$ is the remainder of the Hamiltonian. $\hat{H}_\mu(t)$ is assumed to commute with itself at all times and no such assumption is made about $\hat{H}_g(t)$. Transforming into the interaction picture with respect to $\hat{H}_\mu(t)$ gives an interaction picture Hamiltonian $\hat{H}_I(t)$:

$$\hat{H}_I(t) = \hat{U}^\dagger(t)\hat{H}(t)\hat{U}(t) + i\hbar \dot{\hat{U}}^\dagger(t)\hat{U}(t) = \hat{U}^\dagger(t)\hat{H}_g(t)\hat{U}(t), \quad (2)$$

where $$\hat{U}(t) = \exp\left\{-\frac{i}{\hbar}\int_0^t dt' \hat{H}_\mu(t')\right\}. \quad (3)$$

In this frame, the time evolution of the transformed state $$|\phi(t)\rangle = \hat{U}^\dagger(t)|\psi(t)\rangle, \quad (4)$$

Is governed by the interaction picture Schrödinger equation $$i\hbar|\dot\phi(t)\rangle = \hat{H}_I(t)|\phi(t)\rangle. \quad (5)$$

After applying $\hat{H}_I(t)$ to $|\psi(0)\rangle$, for a duration $t_f$, the evolution of $|\psi(t_f)\rangle$ is described by the unitary propagator $\hat{T}_I(t_f)$ obtained by solving Eq. (5). Thus, the final state in the original frame is given by:

$$|\psi(t_f)\rangle = \hat{U}(t_f)|\phi(t_f)\rangle = \hat{U}(t_f)\hat{T}_I(t_f)|\phi(0)\rangle = \hat{U}(t_f)\hat{T}_I(t_f)\hat{U}^\dagger(0)$$
$$|\psi(0)\rangle. \quad (6)$$

If after the time evolution $\hat{U}_I(t_f) \to \hat{I}$ ($\hat{U}^\dagger(0) = \hat{I}$ trivially), where $\hat{I}$ is the identity operator, the evolution of $|\psi(t_f)\rangle$ can be expressed as:

$$|\psi(t_f)\rangle \to \hat{T}_I(t_f)|\psi(0)\rangle, \quad (7)$$

which means that the propagator in the interaction picture is equal to the propagator in the original frame. As described herein, for this system, the limit $\hat{U}_I(t_f) \to \hat{I}$ can be realized by turning $\hat{H}_\mu$ on and off adiabatically with pulse shaping.

Microwave-Driven Bichromatic Gates

A general Hamiltonian for microwave-based gates between n trapped ions with identical qubit frequencies (which can be used to describe both laser-based gates and microwave-based gates) can be expressed as:

$$\hat{H}_{lab}(t) = \frac{\hbar\omega_0}{2}\hat{S}_z + \hbar\omega_r \hat{a}^\dagger \hat{a} + \quad (8)$$
$$2\hbar\Omega_\mu \hat{S}_i\{\cos([\omega_0 + \delta]t) + \cos([\omega_0 - \delta]t)\} + 2\hbar\Omega_g f(t)\hat{S}_j\{\hat{a} + \hat{a}^\dagger\}.$$

The n-ion Pauli spin operators can be defined as $\hat{S}_i = \Sigma_n \hat{\sigma}_{i,n}$, with $i \in \{x, y\}$ and $j \in \{x, y, z\}$, where z refers to the qubit quantization axis and $\omega_0$ is the qubit frequency. In certain implementations, an ion crystal has internal states that are coupled via a motional mode with frequency $\omega_r$ and creation (annihilation) operators $\hat{a}^\dagger$ ($\hat{a}$), with all other motional modes sufficiently detuned from $\omega_r$ that they will not couple to the spins. The magnetic field gradient Rabi frequency is $\Omega_g$ and the microwave Rabi frequency is $\Omega_\mu$, with the $\Omega_\mu$ term representing two fields of equal amplitude, detuned from the qubit transition frequency by $\pm\delta$ (with $\delta \ll \omega_0$), which only affect the internal states. The $\Omega_g$ term couples the internal states and the motion and can be implemented with a gradient (e.g., along the motional mode) of the j component of a magnetic field. The time dependence f(t) of the gradient can be an arbitrary function of time (e.g., f(t) can be either constant or sinusoidally oscillating).

Eq. (8) can be transformed into the interaction picture with respect to the "bare" ion Hamiltonian $\hat{H}_0 = \hbar\omega_0 \hat{S}_z/2 + \hbar\omega_r \hat{a}^\dagger \hat{a}$, and make a rotating wave approximation to eliminate terms near $2\omega_0$, yielding:

$$\hat{H}(t) = \hat{H}_\mu(t) + \hat{H}_g(t) = 2\hbar\Omega_\mu \hat{S}_i \cos(\delta t) + 2\hbar\Omega_g f(t)\hat{S}_j\{\hat{a}e^{-i\omega_r t} + \hat{a}^\dagger e^{i\omega_r t}\}. \quad (9)$$

This reference frame can be referred to as the ion frame, and the Hamiltonians $\hat{H}_\mu(t)$, and $\hat{H}_g(t)$ can be referred to as the microwave field term and the gradient term, respectively, which are the transformed third and fourth terms of Eq. (8). Eq. (9) is valid unconditionally for $j = z$. In the case that $j \in \{x,$ y}, Eq. (9) holds as long as the gradient has a bichromatic oscillating time dependence in the lab frame as described in Eq. (8), i.e., $f(t)=\cos([\omega_0+\delta']t)+\cos([\omega_0-\delta']t)$ for some $\delta' \ll \omega_0$. After transforming into the ion frame and dropping fast-rotating terms near $2\omega_0$, $f(t)$ becomes $\cos(\delta't)$ in Eq. (9). This form of bichromatic oscillating gradient is used herein in describing the near-qubit-frequency oscillating gradient case, with $\delta'=\delta$, since the microwave and gradient terms originate from the same field.

In Eqs. (8) and (9), the operator $\hat{S}_j$ in the gradient term also implicitly incorporates information about the motional mode, and is defined here to correspond to a center-of-mass mode (for two identical ions it could be trivially extended to an out-of-phase mode by setting $\hat{S}_j \equiv \partial_{j,1} - \partial_{j,2}$). For simplicity, all ions are assumed to be the same, and can be addressed with a single pair of microwave fields. The formalism used herein can be generalized to the case of multiple qubit frequencies—either for multiple ion species, or for ions of the same species (see, e.g., Khromova 2012)—by using multiple pairs of microwave fields.

In certain implementations, the gates are described using a reference frame having the ion frame Hamiltonian from Eq. (9) in the bichromatic interaction picture with respect to the microwave field term $\hat{H}_\mu(t)$. This reference frame, rotating at a nonuniform rate, has been utilized in the context of laser-driven gates (see, Roos 2008) to accurately quantify the effect of an off-resonant field. In certain implementations, the $\Omega_\mu$ term is constant (e.g., neglecting pulse shaping), while in certain other implementations, adiabatic pulse shaping is used as described herein.

The bichromatic interaction picture can be expressed using the transformation:

$$\hat{U}(t) = \exp\left\{-\frac{i}{\hbar}\int_0^t dt' H_\mu(t')\right\} = \exp\left\{-2i\Omega_\mu \hat{S}_i \int_0^t dt' \cos(\delta t')\right\} = \exp\{-iF(t)\hat{S}_i\}. \quad (10)$$

where $F(t) \equiv [2\Omega_\mu \sin(\delta t)]/\delta$. The interaction picture Hamiltonian is then:

$$\hat{H}_I(t) = 2\hbar\Omega_g f(t)\{\hat{a}e^{-i\omega_r t} + \hat{a}^\dagger e^{i\omega_r t}\}e^{iF(t)\hat{S}_i}\hat{S}_j e^{iF(t)\hat{S}_i}. \quad (11)$$

Focusing on the Pauli operators in Eq. (11):

$$e^{iF(t)\hat{S}_i}\hat{S}_j e^{-iF(t)\hat{S}_i} = \{\hat{I}\cos(F(t)) + i\hat{S}_i \sin(F(t))\}$$
$$\hat{S}_j e^{-iF(t)\hat{S}_i} = \hat{S}_j + i[\hat{S}_i, \hat{S}_j]\sin(F(t))e^{-iF(t)\hat{S}_i}. \quad (12)$$

Inserting this into Eq. (11) gives:

$$\hat{H}_I(t) = 2\hbar\Omega_g f(t)\{\hat{a}e^{-i\omega_r t} + \hat{a}^\dagger e^{i\omega_r t}\}\{\hat{S}_j + i[\hat{S}_i, \hat{S}_j]\sin(F(t))e^{-iF(t)\hat{S}_i}\}. \quad (13)$$

If $i=j$, then Eq. (12)$\to \hat{S}_j$, and $\hat{H}_I(t)$ is equal to $\hat{H}_g(t)$. However, if $i \neq j$, then Eq. (13) becomes:

$$\hat{H}_I(t) = 2\hbar\Omega_g f(t)\{\hat{a}e^{-i\omega_r t} + \hat{a}^\dagger e^{i\omega_r t}\}\{\hat{S}_j \cos(2F(t)) - \epsilon_{ijk}\hat{S}_k \sin(2F(t))\}. \quad (14)$$

Using the Jacobi-Anger expansion (see, e.g., Abramowitz 1972: *Handbook of mathematical functions* (New York: Dover)), the bichromatic interaction Hamiltonian can be expressed as:

$$\hat{H}_I(t) = \quad (15)$$
$$2\hbar\Omega_g f(t)\{\hat{a}e^{-i\omega_r t} + \hat{a}^\dagger e^{i\omega_r t}\}\left\{\hat{S}_j\left[J_0\left(\frac{4\Omega_\mu}{\delta}\right) 2\sum_{n=1}^{\infty} J_{2n}\left(\frac{4\Omega_\mu}{\delta}\right)\cos(2n\delta t)\right] - 2\epsilon_{ijk}\hat{S}_k\sum_{n=1}^{\infty} J_{2n-1}\left(\frac{4\Omega_\mu}{\delta}\right)\sin([2n-1]\delta t)\right\},$$

where $J_n$ is the nth Bessel function, and $\epsilon_{ijk}$ is the Levi-Civita symbol. Two possible functional forms of the time dependence $f(t)$ of the gradient of the j component of the magnetic field can be considered: (i) sinusoidal, which corresponds to the oscillating magnetic field gradient from an ac-current-carrying wire (see, Ospelkaus 2011; Harty 2016), or (ii) constant, which corresponds to a magnetic field gradient induced by a permanent magnet (see, Khromova 2012, Lake 2015; Weidt 2016: *Phys. Rev. Lett.* 117 220501) or a dc-current-carrying wire (see, Welzel 2018: *arXiv preprint arXiv*:1801.03391).

When $i \neq j$, Eq. (15) shows an infinite series of resonances in the bichromatic interaction picture, each with a strength proportional to a Bessel function. In certain implementations, specific values of the motional mode frequency $\omega_r$, the detuning $\delta$ of the magnetic field gradient Rabi frequency $\Omega_g$ from the qubit transition frequency $\omega_0$, and n can be chosen with a given f such that one of these terms in Eq. (15) is resonant (e.g., stationary or slowly varying in time).

For example, in certain implementations, the detuning $\delta$ is large compared to the magnetic field gradient Rabi frequency $\Omega_g$, such that $\delta \gg \Omega_g f(t)$ (see, Ospelkaus 2008; Ospelkaus 2011; Harty 2016) and near any particular resonance, the off-resonant terms in Eq. (15), whose effect scales as $(\Omega_g f(t)/\delta)^2$, can be ignored. In the case of multiple qubit transition frequencies, there can be additional terms in Eq. (15) at other frequencies. Whether or not these terms can be neglected can depend on the specific values of the qubit transition frequencies as well as the detuning $\delta$, the magnetic field gradient Rabi frequency $\Omega_g$, and the time dependence $f(t)$.

Even Bessel function resonances (e.g., $J_0$, $J_2$, $J_4$, ...) correspond to gate operations where the spin operator $\hat{S}_j$ for the gate is identical to the spin operator for the gradient term in Eq. (9). The odd Bessel function resonances (e.g., $J_1$, $J_3$, $J_5$, ...) correspond to gates whose spin operators $\hat{S}_k$ are orthogonal to both the microwave and gradient spin operators $\hat{S}_i$ and $\hat{S}_j$, respectively. For example, where $i \in \{x,y\}$ and $j=z$, the even and odd Bessel function resonances correspond to $\hat{\sigma}_z \otimes \hat{\sigma}_z$ and $\hat{\sigma}_\phi \otimes \hat{\sigma}_\phi$ gates (specifically, $\hat{\sigma}_x \otimes \hat{\sigma}_x$ or $\hat{\sigma}_y \otimes \hat{\sigma}_y$ gates, depending on the choice of i).

FIG. 1 shows the relative strengths of the gate Rabi frequencies corresponding to the first three resonances versus $4\Omega_\mu/\delta$ in accordance with certain implementations described herein. These strengths shown in FIG. 1 are plotted in the bichromatic interaction picture in which the microwave field term (corresponding to the microwave spin operator $\hat{S}_i$) does not commute with the gradient field term (corresponding to the gradient spin operator $\hat{S}_j$) in the Hamiltonian of Eq. (15).

In certain implementations, a dynamically decoupled entangling gate operation can be performed without adding an extra field, which can simplify the physical configuration as compared to other configurations in which an additional field is added. In general, dynamical decoupling (see, e.g., Viola 1998; Viola 1999; Uhrig 2007: *Phys. Rev. Lett.* 98 100504) is a useful tool for error suppression in trapped-ion quantum logic experiments (see, e.g., Harty 2016; Bermudez 2012; Tan 2013; Biercuk 2009: *Phys. Rev.* A 79 062324; Timoney 2011: *Nature* 476 185; Piltz 2013: *Phys. Rev. Lett.* 110 200501; Manovitz 2017: *Phys. Rev. Lett.* 119 220505). For example, by adding an oscillating magnetic field at the qubit transition frequency that commutes with the gate but not with qubit frequency fluctuations, thus suppressing the leading source of error while leaving the gate unaffected, Harty 2016 disclosed continuous dynamical decoupling that achieved an entangling gate fidelity of approximately 0.997, making the gate operation highly insensitive to qubit frequency fluctuations.

The dynamical decoupling of certain implementations described herein can be illustrated by adding an error term to the Hamiltonian shown in Eq. (9):

$$\hat{H}_z = \frac{\hbar\varepsilon}{2}\hat{S}_z, \tag{16}$$

where ε is a qubit frequency shift (which can be time-dependent), arising, for example from environmental noise, control field fluctuations, and/or miscalibration of the qubit transition frequency $\omega_0$. With $i \in \{x, y\}$, this term can be transformed into the bichromatic interaction picture:

$$\hat{H}_{I,z} = \frac{\hbar\varepsilon}{2}\left\{\hat{S}_z\left[J_0\left(\frac{4\Omega_\mu}{\delta}\right) + 2\sum_{n=1}^{\infty}J_{2n}\left(\frac{4\Omega_\mu}{\delta}\right)\cos(2n\delta t)\right] + \right. \tag{17}$$

$$\left. 2\epsilon_{ijk}\hat{S}_k\sum_{n=1}^{\infty}J_{2n-1}\left(\frac{4\Omega_\mu}{\delta}\right)\sin([2n-1]\delta t)\right\}.$$

If the qubit frequency shift E varies slowly (e.g., on timescales of 1/δ), then the only term $\hat{H}_{I,z}$ that is not oscillating near a multiple of δ is proportional to $J_0(4\Omega_\mu/\delta)$. Therefore, in certain implementations in which $(4\Omega_\mu/\delta)$ is approximately equal to the first zero of the $J_0$ Bessel function (e.g., 2.405), intrinsic dynamical decoupling is achieved since only the fast-oscillating qubit frequency shift terms are left, and these terms contribute negligible dephasing (e.g., contributions scaling as $(\varepsilon/\delta)^2$). As can be seen in FIG. 1, the value of $(4\Omega_\mu/\delta)$ where intrinsic dynamical decoupling is achieved occurs near the maxima of the $J_1$ and $J_2$ Bessel functions, so operating at this value of $(4\Omega_\mu/\delta)$ only results in a relatively small reduction in gate speed (e.g., reduction of about 11% relative to the fastest achievable $J_1$ and $J_2$ gates).

In certain implementations, the microwave bichromatic field is smoothly ramped on and off over a time $\tau \gg 2\pi/\delta$, such that the final wave function in the ion frame approaches the final wave function in the bichromatic interaction picture (e.g., adiabatic pulse shaping). By turning the microwave pair (as parameterized by $\Omega_\mu$) is turned on and off in such a manner that $\hat{U}(t_i)=\hat{I}$ and $\hat{U}(t_f)=\hat{I}$, the state evolution given by the propagator $\hat{T}_I(t_i, t_f)$ of $\hat{H}_I(t)$ applies to both the lab frame and the transformed basis in the bichromatic interaction picture. In other words, the unitary transformation defined by Eq. (3) approaches the identity operator, $\hat{U}(t_f) \to \hat{I}$. In certain implementations, this condition can be achieved by turning the microwave pair on and off slowly with respect to 1/δ, or by choosing the gate time $t_G$ (e.g., the time during which the microwave pair is on) such that $t_G\delta$ is an integer multiple of $2\pi$.

In certain implementations, such microwave pulse shaping can be modeled by modifying the microwave field term in Eq. (9) to include a time-dependent envelope g(t) with a continuous first derivative:

$$\hat{H}_\mu(t) \to 2\Omega_\mu g(t)\cos(\delta t)\hat{S}_i, \tag{18}$$

where g(t) varies slowly (e.g., on the timescale $2\pi/\delta$) and the microwave Rabi frequency is equal to zero at the beginning and end of the gate operation, and is constant in between the ramps, such that the pulse shape satisfied the following:

$$g(t=0,t_f)=0$$

$$g(\tau \leq t \leq t_f-\tau)=1, \tag{19}$$

where $t_f$ is the final gate time. At the end of the gate operation, the unitary transformation into the bichromatic interaction picture can be expressed as:

$$\hat{U}(t_f)=\exp\{-i\int_0^{t_f}dt' 2\Omega_\mu g(t')\cos(\delta t')\hat{S}_i\}. \tag{20}$$

and, by integrating by parts:

$$\hat{U}(t_f) = \exp\left\{\frac{2i\Omega_\mu}{\delta}\left(\int_0^\tau dt'\dot{g}(t')\sin(\delta t') + \int_{t_f-\tau}^{t_f}dt'\dot{g}(t')\sin(\delta t')\right)\hat{S}_i\right\}. \tag{21}$$

In certain implementations in which $\dot{g}(t)$ is a slowly varying function with respect to $\sin(\delta t)$, the larger the value of τ is relative to $2\pi/\delta$, the smaller the values of the two integrals are in Eq. (21). Thus, in the limit $\tau \gg 2\pi/\delta$, $\hat{U}(t_f) \to \hat{I}$, and the final ion frame state approaches the final interaction picture state. This effect is independent of the actual shape of the pulse envelope, provided it is slowly varying, as described more fully herein with regard to the example of the near-motional-frequency oscillating gradient. In certain implementations, pulse shaping can slightly change the optimal gate times due to the changing Rabi frequency during the rise and fall times.

EXAMPLE IMPLEMENTATIONS

Various implementations of microwave-based entangling gates, with corresponding Pauli spin operators $\hat{S}_i$, $\hat{S}_j$, and time dependence f(t) of the magnetic field gradient, can be described using the formalism herein.

Example 1: Static Magnetic Field Gradient

In a first example of a gate utilizing a microwave spin-motion coupling scheme, the magnetic field gradient is static (e.g., f(t) is constant, as can be provided by a permanent magnet) and is used in combination with one or more microwave fields (see, e.g., Minert 2001; Lake 2015). The ion frame Hamiltonian can be expressed as:

$$\hat{H}(t)=2\hbar\Omega_\mu\hat{S}_x\cos(\delta t)+2\hbar\Omega_g\hat{S}_z\{\hat{a}e^{-i\omega_r t}+\hat{a}^\dagger e^{i\omega_r t}\}. \tag{22}$$

which corresponds to $\hat{S}_i=\hat{S}_x$, $\hat{S}_j=\hat{S}_z$, and f(t)=1 in Eq. (9), and Eq. (15) becomes:

$$\hat{H}_I(t) = \tag{23}$$

$$2\hbar\Omega_g\{\hat{a}e^{-i\omega_r t}+\hat{a}^\dagger e^{i\omega_r t}\}\left\{\hat{S}_z\left[J_0\left(\frac{4\Omega_\mu}{\delta}\right)+2\sum_{n=1}^{\infty}J_{2n}\left(\frac{4\Omega_\mu}{\delta}\right)\cos(2n\delta t)\right]+\right.$$

$$\left. 2\hat{S}_y\sum_{n=1}^{\infty}J_{2n-1}\left(\frac{4\Omega_\mu}{\delta}\right)\sin([2n-1]\delta t)\right\}.$$

By having $\Omega_g \ll \delta$ (e.g., keeping only the near resonant terms in Eq. (23)) provides a $\hat{\sigma}_z \otimes \hat{\sigma}_z$ gate (e.g., a "ZZ gate") when $2n\delta$ is approximately equal to the motional mode frequency $\omega_r$, and provides a $\hat{\sigma}_\phi \otimes \hat{\sigma}_\phi$ gate (e.g., a $\hat{\sigma}_y \otimes \hat{\sigma}_y$ gate or "YY gate") when $(2n-1)\delta$ is approximately equal to the motional mode frequency $\omega_r$.

Example 2: Near-Qubit-Frequency Oscillating Gradient

In a second example of a gate utilizing a microwave spin-motion coupling scheme, the near-field gradient oscillates at a frequency close to the qubit frequency $\omega_0$ (see, e.g., Ospelkaus 2008; Ospelkaus 2011). The gradient and the microwave terms are caused by the same field and point in the same direction. The ion frame Hamiltonian can be expressed as:

$$\hat{H}(t) = 2\hbar\Omega_\mu \cos(\delta t)\hat{S}_x + 2\hbar\Omega_g \cos(\delta t)\hat{S}_x\{\hat{a}e^{-i\omega_r t} + \hat{a}^\dagger e^{i\omega_r t}\}. \quad (24)$$

which corresponds to $\hat{S}_i = \hat{S}_x$, $\hat{S}_j = \hat{S}_x$, and $f(t) = \cos(\delta t)$ in Eq. (9). Since the microwave term commutes with the gradient term, the bichromatic interaction picture Hamiltonian can be expressed as:

$$\hat{H}_I(t) = 2\hbar\Omega_g \cos(\delta t)\hat{S}_x\{\hat{a}e^{-i\omega_r t} + \hat{a}^\dagger e^{i\omega_r t}\}. \quad (25)$$

This Hamiltonian provides a $\hat{\sigma}_\phi \otimes \hat{\sigma}_\phi$ gate (e.g., a $\hat{\sigma}_x \otimes \hat{\sigma}_x$ gate or "XX gate"). The infinite series of resonances in Eq. (15) is absent because the microwave term and the gradient term commute (i=j). In the presence of a qubit frequency shift of the form in Eq. (16), transforming into the bichromatic interaction picture adds a term to Eq. (25) of the form shown in Eq. (17), which can be analyzed as disclosed herein regarding intrinsic dynamical decoupling.

Example 3: Near-Motional-Frequency Oscillating Gradient

In a third example of a gate utilizing a microwave spin-motion coupling scheme, separate gradient and microwave fields can be used that are oscillating at near-motional and near-qubit frequencies, respectively. A previous laser-based configuration utilized a running optical lattice to create an oscillating gradient of the ac Stark shift near the ion motional frequencies (Ding 2014: *Phys. Rev. Lett.* 113 073002). In certain implementations of a microwave-based configuration, separate near-qubit and near-motional frequency currents can be superimposed on near-field electrodes in a surface electrode trap (see, Srinivas 2019). In certain such implementations in which the gradient lies along the quantization axis and the microwave fields are perpendicular to the quantization axis, the ion frame Hamiltonian can be expressed as:

$$\hat{H}(t) = 2\hbar\Omega_\mu \cos(\delta t)\hat{S}_x + 2\hbar\Omega_g \cos(\omega_g t)\hat{S}_z\{\hat{a}e^{-i\omega_r t} + \hat{a}^\dagger e^{i\omega_r t}\}, \quad (26)$$

where $\omega_g$ is the frequency of the oscillating gradient field, $\hat{S}_i = \hat{S}_x$, $\hat{S}_j = \hat{S}_z$, and $f(t) = \cos(\omega_g t)$ so that Eq. (15) becomes:

$$\hat{H}_I(t) = 2\hbar\Omega_g \cos(\omega_g t)\{\hat{a}e^{-i\omega_r t} + \hat{a}^\dagger e^{i\omega_r t}\} \quad (27)$$

$$\left\{\hat{S}_z\left[J_0\left(\frac{4\Omega_\mu}{\delta}\right) + 2\sum_{n=1}^\infty J_{2n}\left(\frac{4\Omega_\mu}{\delta}\right)\cos(2n\delta t)\right] + 2\hat{S}_y \sum_{n=1}^\infty J_{2n-1}\left(\frac{4\Omega_\mu}{\delta}\right)\sin([2n-1]\delta t)\right\}.$$

The near-motional-frequency oscillating gradient example of Eq. (27) is similar to the static field example of Eq. (23), only with resonances occurring when $\delta$ is close to (e.g., within 10%) of an integer multiple of $|\omega_r \pm \omega_g|$, rather than $\omega_r$. As a result, the Bessel function extrema and roots can be reached with lower values of $\Omega_\mu$ than for the static or near-qubit frequency gradient examples. In certain implementations, this third example can produce a $\hat{\sigma}_\phi \otimes \hat{\sigma}_\phi$ gate (e.g., a $\hat{\sigma}_y \otimes \hat{\sigma}_y$ gate or "YY gate"), while in certain other implementations, this third example can produce a $\hat{\sigma}_z \otimes \hat{\sigma}_z$ gate (e.g., "ZZ gate").

YY Gate of Example 3

In certain implementations, the near-motional-frequency oscillating gradient can be used in which a pair of microwave fields, oscillating near the qubit transition frequency $\omega_0$ and polarized in the $\hat{x}$ direction, are combined with a gradient field oscillating near the motional frequency $\omega_r$ and polarized in the $\hat{z}$ direction. However, the qualitative results described herein apply to the other two examples described herein. By setting $\delta \sim (\omega_r - \omega_g)$ and only keeping the resonant terms in Eq. (27) gives:

$$\hat{H}_I(t) \approx i\hbar\Omega_g J_1\left(\frac{4\Omega_\mu}{\delta}\right)\hat{S}_y\{\hat{a}^\dagger e^{-i\Delta t} - \hat{a}e^{i\Delta t}\}, \quad (28)$$

where $\Delta \equiv \delta - (\omega_r - \omega_g)$. Eq. (28) corresponds to a $\hat{\sigma}_\phi \otimes \hat{\sigma}_\phi$ gate (e.g., a $\hat{\sigma}_y \otimes \hat{\sigma}_y$ gate or "YY gate") with a Rabi frequency of $\Omega_\phi \equiv \Omega_g J_1(4\Omega_\mu/\delta)$. While the time propagator for the ion frame Hamiltonian (see, Eq. (26)) is fairly complicated to solve analytically, the time propagator for this interaction picture Hamiltonian is well-known (see, e.g., Mølmer 1999; Sørensen 2000; Roos 2008; Solano 1999: *Phys. Rev.* A 59 R2539). At $t_f = 2\pi/\Delta$, the propagator is:

$$\hat{T}_I(t_f) = \exp\left\{-\frac{2\pi i}{\Delta^2}(\Omega_\phi \hat{S}_y)^2\right\}. \quad (29)$$

For a system starting in the ground state $|\downarrow\downarrow\rangle$, this gate generates a maximally entangled Bell state when $\Delta = 4\Omega_\phi$:

$$|\text{Bell}\rangle \equiv \frac{1}{\sqrt{2}}\{|\downarrow\downarrow\rangle + i|\uparrow\uparrow\rangle\}, \quad (30)$$

ignoring an overall phase.

Figure 2A:
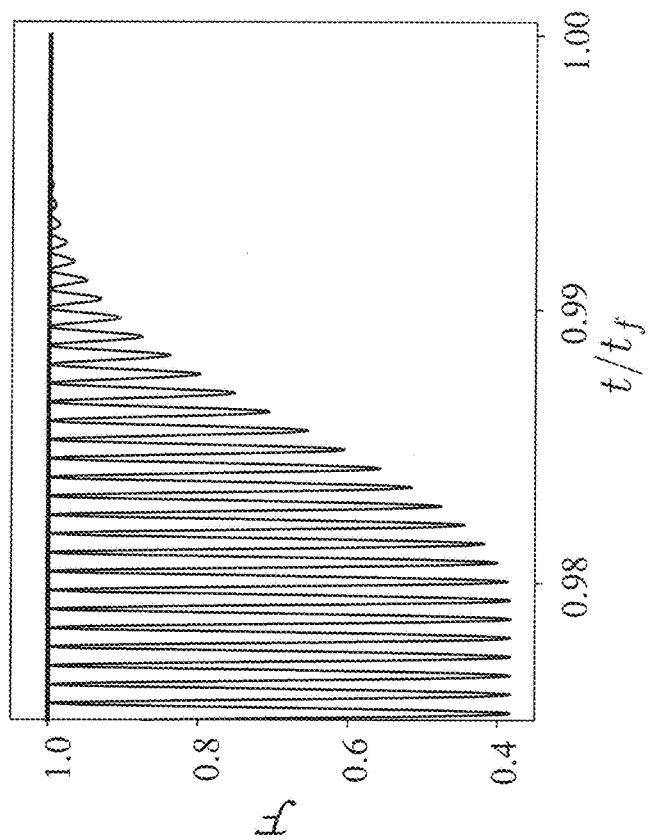
FIGS. 2A and 2B are plots of the gate fidelity $\mathcal{F}$, in both the bichromatic interaction picture and the ion frame, for the YY gate operation with no pulse shaping and with pulse shaping, respectively, in accordance with certain implementations described herein.
Figure 2B:
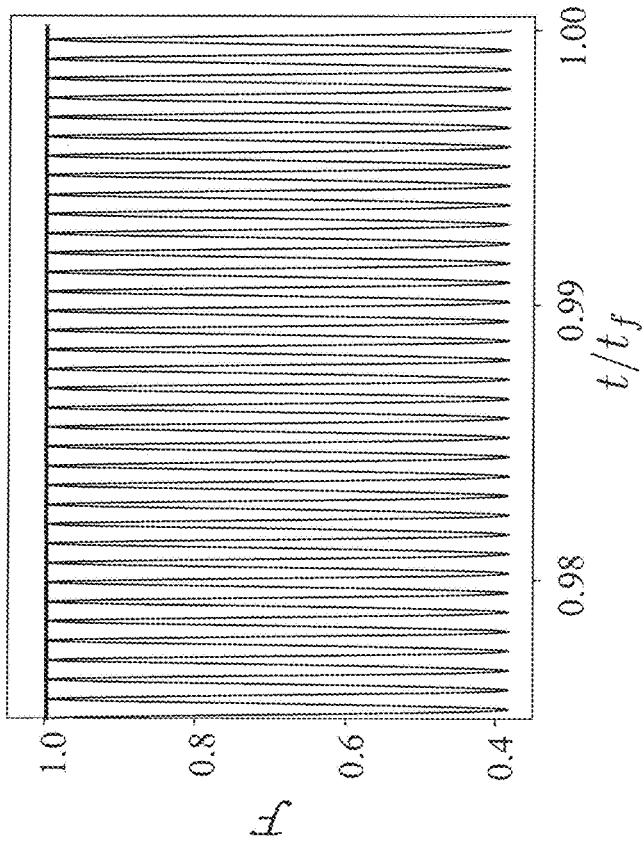

FIGS. 2A and 2B show numerical simulations of the fidelity $\mathcal{F} \equiv \langle \text{Bell}|\hat{\rho}(t)|\text{Bell}\rangle$ for the $\hat{\sigma}_\phi \otimes \hat{\sigma}_\phi$ gate of the maximally entangled Bell state of Eq. (30) versus time (normalized to $t_f$), where $\hat{\rho}(t)$ is the reduced density operator for the qubit subspace, in accordance with certain implementations described herein. Both FIGS. 2A and 2B simulate the $\hat{\sigma}_\phi \otimes \hat{\sigma}_\phi$ gate operation for a two-ion system, with the high frequency thin line corresponding to the full ion frame Hamiltonian of Eq. (26), and the thick generally horizontal line corresponding to the bichromatic interaction picture Hamiltonian of Eq. (28). The physical parameters used in FIGS. 2A and 2B were $\Omega_\mu/2\pi = 500$ kHz, $\Omega_g/2\pi = 1$ kHz, $\omega_r/2\pi = 6.5$ MHz, and $\omega_g/2\pi = 5$ MHz, and $\hat{S}_i = \hat{S}_x$, $\hat{S}_j = \hat{S}_z$.

FIG. 2A shows the gate fidelity $\mathcal{F}$, in both the bichromatic interaction picture and the ion frame, for the $\hat{\sigma}_\phi \otimes \hat{\sigma}_\phi$ gate operation with no pulse shaping, where large-amplitude oscillations at $\delta$ make the ion frame gate fidelity highly sensitive to the exact value of $t_f$. In the interaction picture (e.g., $|\phi(t)\rangle$ as opposed to $|\psi(t)\rangle$ as disclosed herein with regard to the interaction picture dynamics), the state $|\text{Bell}\rangle$ is created with $\mathcal{F} = 1$. However, in the ion frame, the fidelity $\mathcal{F}$ oscillates according to $\mathcal{F} \propto \cos^4((2\Omega_\mu/\delta)\sin(\delta t))$. The peak value of the ion frame fidelity $\mathcal{F}$ agrees with the fidelity $\mathcal{F}$ from the bichromatic interaction picture to within the numerical accuracy of the simulations (approximately $10^{-5}$), indicating that the off-resonant terms dropped from Eq. (27) do not impact fidelity $\mathcal{F}$ at this level.

FIG. 2B shows the same $\hat{\sigma}_\phi \otimes \hat{\sigma}_\phi$ gate operation including a microwave envelope g(t) with a 10 μs Blackman edge at the rising and falling edges (e.g., at the beginning and the end of the gate sequence). As seen in FIG. 2B, the ion frame fidelity smoothly converges to the interaction picture fidelity at the end of the gate, as disclosed herein with regard to the adiabatic pulse shaping. Thus, even in the presence of a strong bichromatic microwave field term, high fidelity gates can be implemented. Certain such implementations enable simplification of the physical configuration, since the microwave magnetic field does not have to be minimized at the ions' positions. Furthermore, in certain implementations, the strength of the microwave magnetic field can be tuned to decouple the system from qubit frequency shifts without additional drive fields.

Figure 3A:
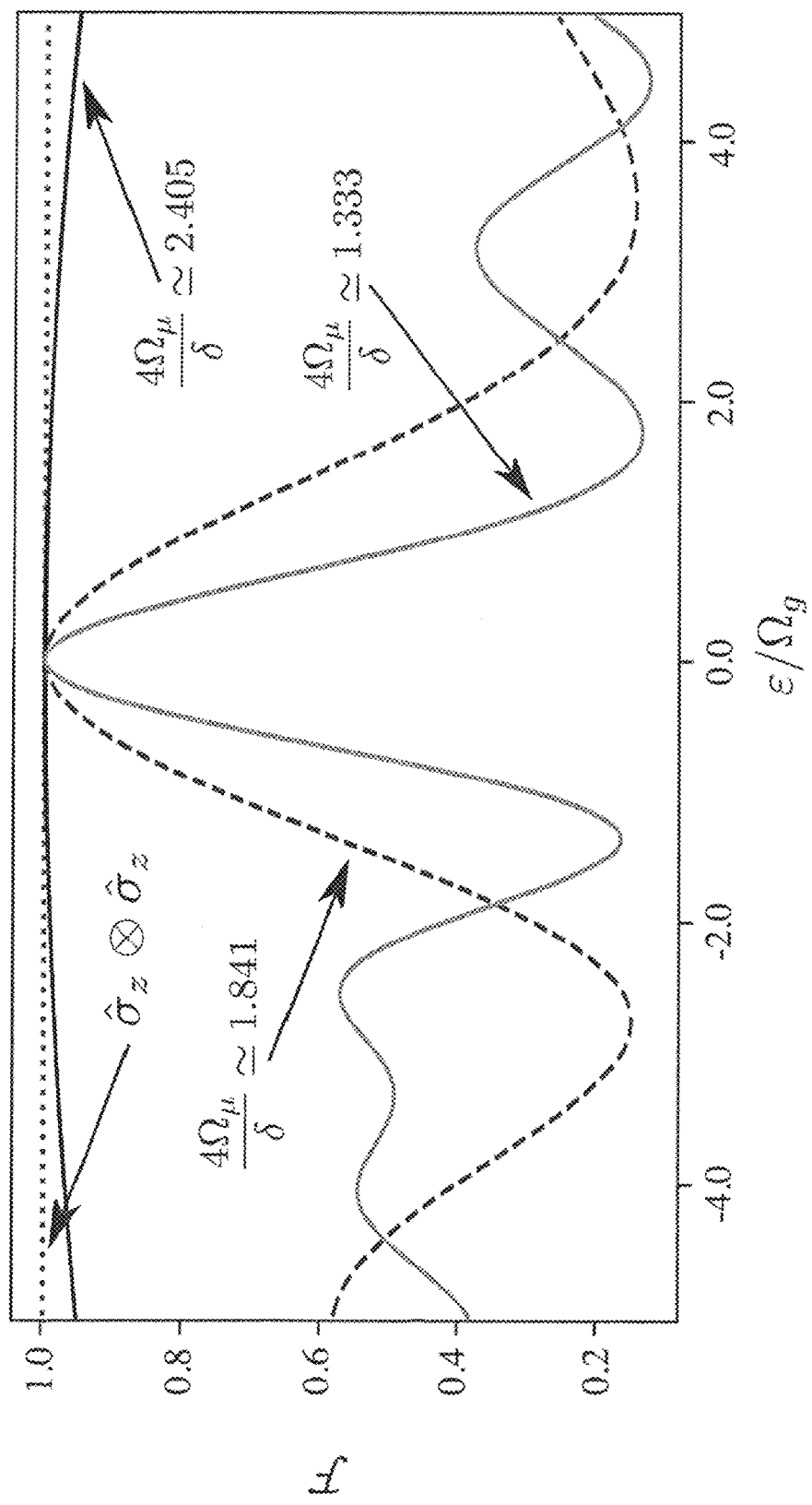
FIG. 3A is a plot of the gate fidelity of a YY gate and a ZZ gate in accordance with certain implementations described herein.

FIG. 3A shows the effect of the intrinsic dynamical decoupling on the $\hat{\sigma}_\phi \otimes \hat{\sigma}_\phi$ gate in accordance with certain implementations described herein. FIG. 3A is a plot of the gate fidelity $\mathcal{F}$ of the gate operation creating the maximally entangled Bell state of Eq. (30) as a function of the normalized static qubit frequency shift $\epsilon/\Omega_g$. The plots of FIG. 3A were calculated using the physical parameters of FIGS. 2A and 2B, but varying the microwave Rabi frequency $\Omega_\mu$ to change the arguments of the Bessel functions and using numerical integration of the full ion frame Hamiltonian of Eq. (26). As seen in FIG. 3A, for most values of $\Omega_\mu$, the gate fidelity $\mathcal{F}$ is highly sensitive to qubit frequency fluctuations. For both a gate of FIGS. 2A and 2B (e.g., $4\Omega_\mu/\delta \approx 1.333$), and for a gate with $\Omega_\mu$ increased to achieve a maximized gate speed (e.g., $4\Omega_\mu/\delta \approx 1.841$), the value of the gate fidelity $\mathcal{F}$, when $|\epsilon|/\Omega_g \gtrsim 1$, drops to ~0.5. However, when $\Omega_\mu$ is further increased such that $4\Omega_\mu/\delta \approx 2.405$ (i.e., the first root of the $J_0$ Bessel function), the gate fidelity $\mathcal{F}$ becomes significantly less sensitive to $\epsilon$, giving $\mathcal{F} \geq 0.95$ for $|\epsilon|/\Omega_g \leq 5$.

Figure 3B:
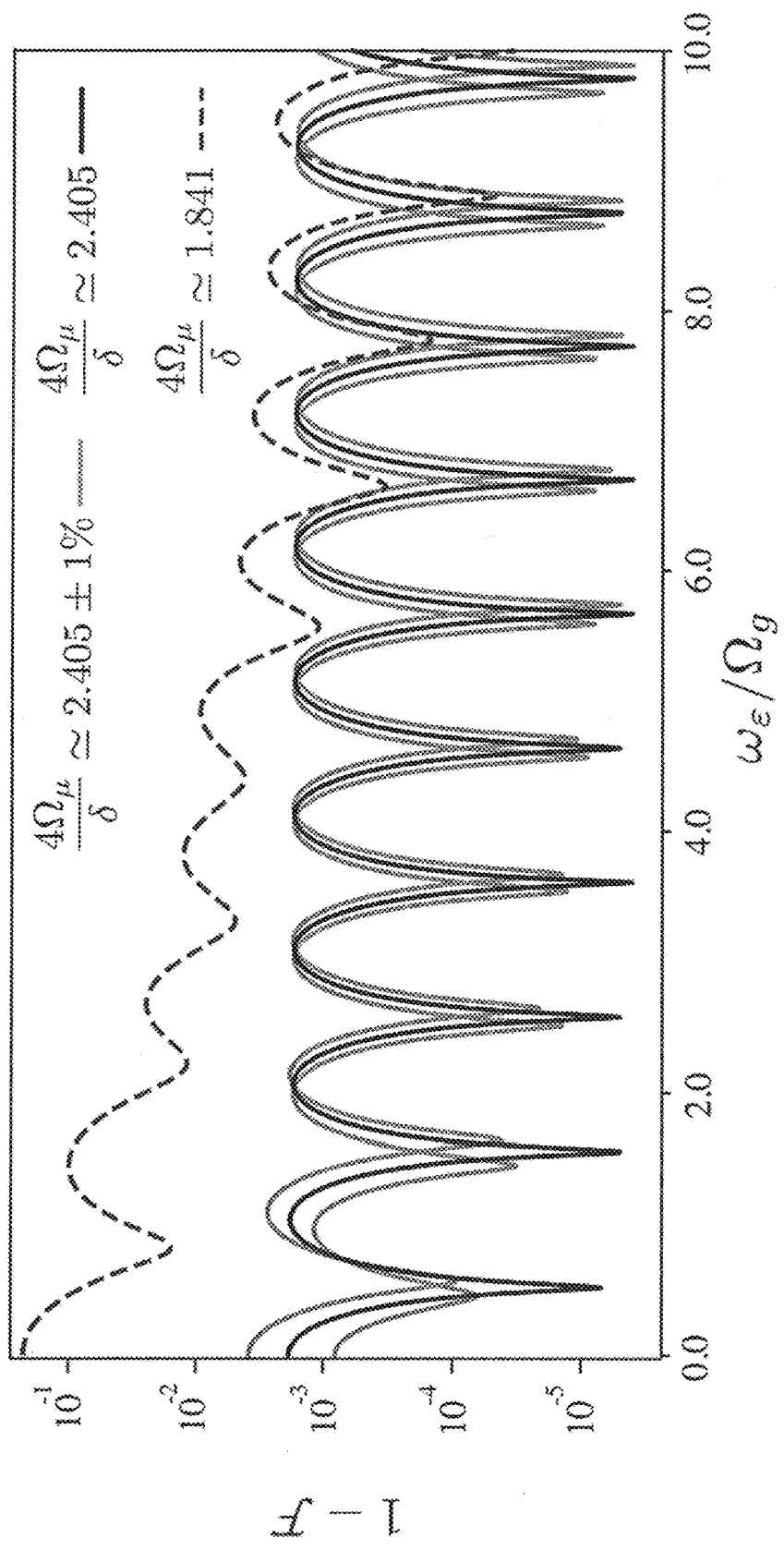
FIG. 3B is a plot of the gate infidelity $1-\mathcal{F}$ of a YY gate in accordance with certain implementations described herein.

FIG. 3B is a plot of the gate infidelity $1-\mathcal{F}$ of the $\hat{\sigma}_\phi \otimes \hat{\sigma}_\phi$ gate as a function of the frequency $\omega_\epsilon$ at which the qubit shift $\epsilon$ is time-varying (e.g., $\epsilon = \epsilon_0 \cos(\omega_\epsilon t)$ with the value of $\epsilon_0 = \Omega_g$) in accordance with certain implementations described herein. This value of $\epsilon_0$ corresponds to a significantly larger qubit shift than the value $|\epsilon_0| \ll \Omega_g$ typically used experimentally (see, Harty 2016). FIG. 3B includes the gate infidelity $1-\mathcal{F}$ for an intrinsically dynamically decoupled $\hat{\sigma}_\phi \otimes \hat{\sigma}_\phi$ gate (e.g., $4\Omega_\mu/\delta \approx 2.405$; solid black line) and for a $\hat{\sigma}_\phi \otimes \hat{\sigma}_\phi$ gate with $\Omega_\mu$ increased to achieve a maximized gate speed (e.g., $4\Omega_\mu/\delta \approx 1.841$; dashed line). As shown in FIG. 3B, intrinsic dynamical decoupling in certain implementations protects against qubit energy shifts at frequencies up to $\approx 10\Omega_g$. FIG. 3B also shows the sensitivity of intrinsic dynamical decoupling to small fluctuations in $\Omega_\mu/\delta$ by including the infidelity when the ratio $4\Omega_\mu/\delta$ is shifted by 1% above and below the intrinsic dynamical decoupling point (e.g., $4\Omega_\mu/\delta \approx 2.405 \pm 1\%$; grey solid lines). Similar simulations for various values of $\epsilon_0$ can show that the infidelity scales as $(\epsilon_0/\Omega_g)^2$ for $\epsilon_0 \leq \Omega_g$.

In contrast with the dynamically decoupled $\hat{\sigma}_\phi \otimes \hat{\sigma}_\phi$ gate disclosed by Harty 2016, certain implementations described herein do not utilize an additional field to provide the dynamical decoupling, and the microwave field term generating the dynamical decoupling does not have to commute with the gradient term in the Hamiltonian. In certain implementations, as described more fully herein, the infinite series of resonances resulting from the microwave field term not commuting with the gradient advantageously provides a $\hat{\sigma}_z \otimes \hat{\sigma}_z$ microwave gate in which all frequencies are detuned from the ions' motional modes.

ZZ Gate of Example 3

In certain implementations, as described herein, dynamical decoupling can be beneficial for high-fidelity $\hat{\sigma}_\phi \otimes \hat{\sigma}_\phi$ gates, because the terms in the Hamiltonian that represent qubit frequency shifts do not commute with the $\hat{\sigma}_\phi \otimes \hat{\sigma}_\phi$ gate. However, qubit frequency shifts do commute with a $\hat{\sigma}_z \otimes \hat{\sigma}_z$ gate, so, in certain implementations described herein, a simple spin-echo sequence can substantially cancel (e.g., completely cancel) the effect of static qubit frequency shifts. Previously, the only proposed technique for performing microwave-based $\hat{\sigma}_z \otimes \hat{\sigma}_z$ gates included generating oscillating gradients near the ions' motional frequencies, where experimental imperfections can give rise to electric fields that excite the ions' motion and can reduce fidelity, making the $\hat{\sigma}_z \otimes \hat{\sigma}_z$ gate difficult to perform in practice (see, Ospelkaus 2008).

Referring back to Eq. (27), a $\hat{\sigma}_z \otimes \hat{\sigma}_z$ gate having a near-motional-frequency oscillating gradient is provided when $2n\delta \sim |\omega_r - \omega_g|$. For n=0, Eq. (27) corresponds to a $\hat{\sigma}_z \otimes \hat{\sigma}_z$ gate with $\omega_g \approx \omega_r$, and for n=1, Eq. (27) can be expressed as:

$$\hat{H}_I(t) \simeq \hbar\Omega_g J_2\left(\frac{4\Omega_\mu}{\delta}\right) \hat{S}_z \{\hat{a} e^{i\Delta t} - \hat{a}^\dagger e^{-i\Delta t}\}, \quad (31)$$

where $\Delta \equiv 2\delta - (\omega_r - \omega_g)$. Eq. (31) corresponds to a $\hat{\sigma}_z \otimes \hat{\sigma}_z$ gate (e.g., a "ZZ gate") in which both the frequency $\omega_g$ of the oscillating gradient field and the detuning $\delta$ of the microwave Rabi frequency $\Omega_\mu$ from the qubit transition frequency $\omega_0$ can deviate significantly from the motional mode frequency $\omega_r$, which relaxes the constraints on residual electric fields. These electric fields can drive the ion motion off-resonantly at $\omega_g$, and for a given electric field strength, the resulting motional amplitude can scale as $1/(\omega_r^2 - \omega_g^2)$.

In certain embodiments, the $\hat{\sigma}_z \otimes \hat{\sigma}_z$ gate operation is performed with a spin-echo pulse after the first of two loops in phase space, thereby substantially canceling (e.g., completely canceling) the effect of the static shifts. In certain implementations, intrinsic dynamical decoupling can be applied to the $\hat{\sigma}_z \otimes \hat{\sigma}_z$ gate, in addition application of the spin echo.

Figure 4:
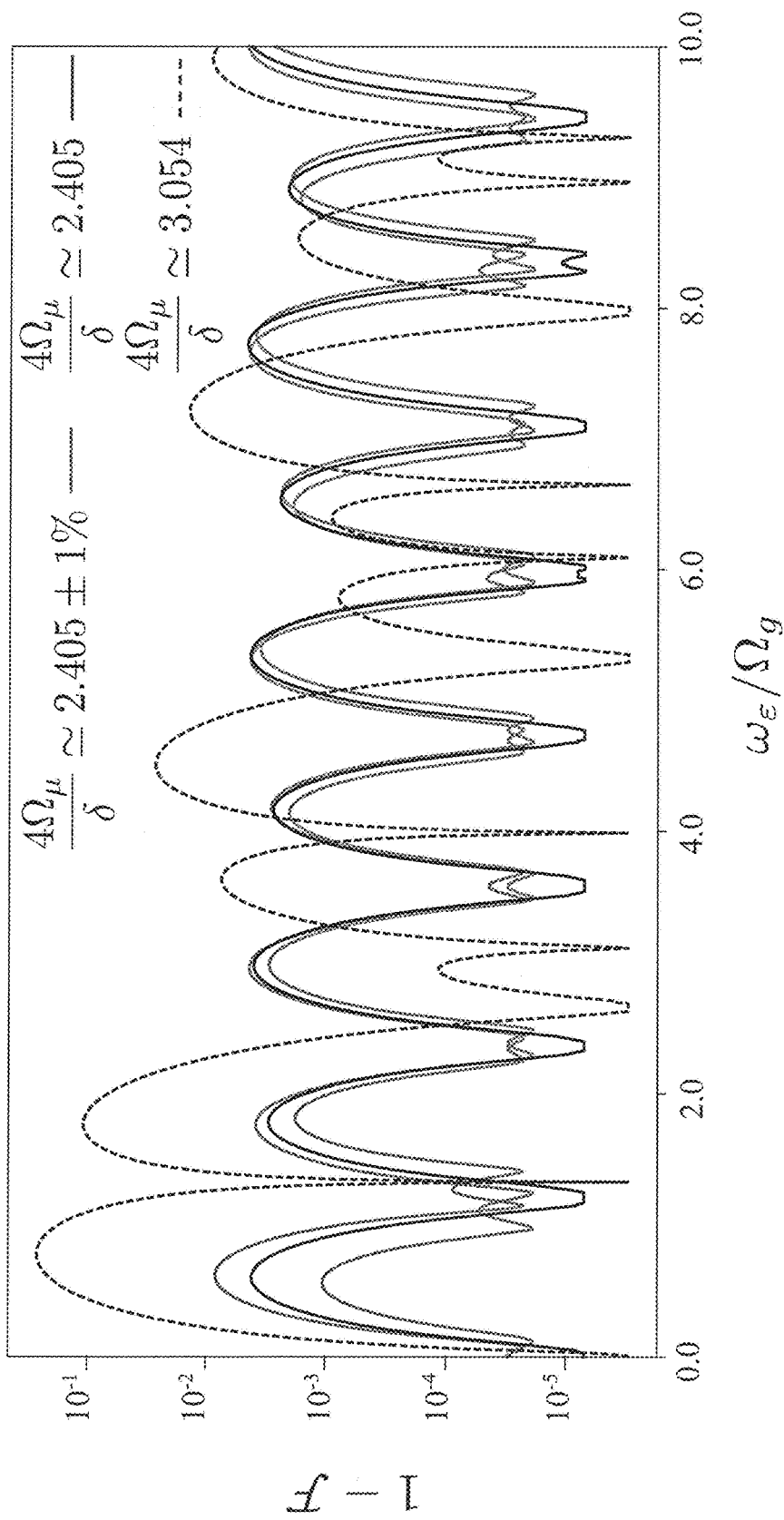
FIG. 4 is a plot of the gate infidelity $1-\mathcal{F}$ of a ZZ gate in accordance with certain implementations described herein.

FIG. 3A shows the substantial (e.g., complete) insensitivity to static qubit shifts for the $\hat{\sigma}_z \otimes \hat{\sigma}_z$ gate operation (dotted line). FIG. 4 is a plot of the gate infidelity $1-\mathcal{F}$ of the $\hat{\sigma}_z \otimes \hat{\sigma}_z$ gate as a function of the frequency $\omega_\epsilon$ at which the qubit shift $\epsilon$ is time-varying (e.g., $\epsilon = \epsilon_0 \cos(\omega_\epsilon t)$ with the value of $\epsilon_0 = \Omega_g$) in accordance with certain implementations described herein. This value of $\epsilon_0$ corresponds to a significantly larger qubit shift than the value $|\epsilon_0| \ll \Omega_g$ as typically used experimentally (see, Harty 2016). FIG. 4 includes the gate infidelity $1-\mathcal{F}$ for an intrinsically dynamically decoupled $\hat{\sigma}_z \otimes \hat{\sigma}_z$ gate (e.g., $4\Omega_\mu/\delta \approx 2.405$; solid black line) and for a $\hat{\sigma}_z \otimes \hat{\sigma}_z$ gate with $\Omega_\mu$ increased to achieve a maximized gate speed $J_2(4\Omega_\mu/\delta \approx 3.054) \approx 0.49$ (dashed line). FIG. 4 also shows the sensitivity of intrinsic dynamical decoupling to small fluctuations in $\Omega_\mu/\delta$ by including the infidelity when the ratio $4\Omega_\mu/\delta$ is shifted by 1% above and below the intrinsic dynamical decoupling point (e.g., $4\Omega_\mu/\delta \approx 2.405 \pm 1\%$; grey solid lines), showing the sensitivity of the $\hat{\sigma}_z \otimes \hat{\sigma}_z$ gate to time-varying qubit shifts. While the $\hat{\sigma}_z \otimes \hat{\sigma}_z$ gate is less sensitive to static ($\omega_\epsilon = 0$) noise, it remains sensitive to noise with larger values of $\omega_g$. Similar simulations for various values of $\epsilon_0$ can show that the infidelity scales as $(\epsilon_0/\Omega_g)^2$ for $\epsilon_0 \leq \Omega_g$.

Further Implementations of an Example ZZ Gate

In certain implementations, the ZZ gate is configured to provide simultaneous robustness to qubit frequency shifts and to motional decoherence without utilizing additional control fields (e.g., while utilizing only two microwave magnetic fields and one near-motional-frequency magnetic field gradient to perform the gate operation). Certain such implementations advantageously provide a combination of increased gate fidelity for laser-free entangling gates without reducing the gate speed and with decreased experimental overhead (e.g., reduced complexity of the driving fields). For example, a laser-free polychromatic gate system disclosed by Webb 2018 utilized two bichromatic microwave pairs close to the frequency of the side band of a static gradient ($\omega_g=0$) and a total of 12 oscillating control fields plus a strong static magnetic field gradient, certain implementations described herein only utilize three oscillating control fields that include a strong oscillating magnetic field gradient. In addition, while the system disclosed by Webb 2018 produces unavoidable errors unless $\Omega_\mu/\omega_r \ll 1$ (which limits the achievable gate speed), certain implementations described herein do not have such a limitation on $\Omega_\mu$.

Figure 5A:
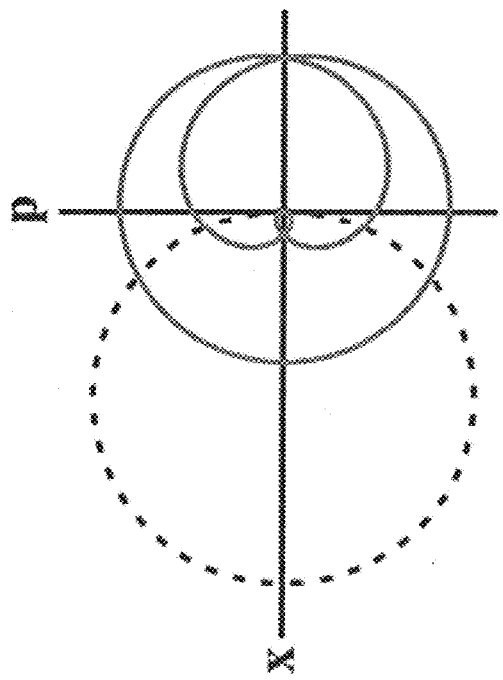
FIG. 5A is a plot of the frequency spectrum of two microwave fields (frequencies: $\omega_0+\delta$ and $\omega_0-\delta$), a magnetic field gradient field (frequency: $\omega_g$), a frequency $\omega_r$ of a shared collective motional mode, and a qubit transition frequency $\omega_0$, in accordance with certain implementations described herein.

FIG. 5A is a plot of the frequency spectrum of two microwave fields (frequencies: $\omega_0+\delta$ and $\omega_0-\delta$), a magnetic field gradient field (frequency: $\omega_g$), and a frequency $\omega_r$ of a shared collective motional mode, and a qubit transition frequency $\omega_0$, in accordance with certain implementations described herein. The two microwave frequency fields are symmetrically detuned around the qubit transition frequency $\omega_0$ by $\pm\delta$, and a separate magnetic field gradient field oscillates at $\omega_g$. As shown in FIG. 5A, $\omega_g$ is approximately one-third of the frequency $\omega_r$ of the shared collective motional mode. Neglecting noise, the dynamics of the example ZZ gate are governed by the Hamiltonian of Eq. (26), where $\Omega_g$ is the magnetic field gradient Rabi frequency, $\Omega_\mu$ is the microwave Rabi frequency (e.g., with $\Omega_\mu \sim \omega_r$), $\hat{a}(\hat{a}^\dagger)$ is a phonon annihilation (creation) operator, $\hat{S}_{\gamma \in \{x,y,z\}}$ is a two-ion Pauli spin operator ($\hat{S}_\gamma = \hat{\sigma}_{\gamma,1} + \hat{\sigma}_{\gamma,2}$), z is taken to be the qubit quantization axis, and $\delta$ is the detuning of the microwaves from the qubit transition frequency $\omega_0$. In certain implementations, fast-rotating terms are neglected, and the strength of $\Omega_g/2\pi$ is in the kHz regime, and $\Omega_\mu/2\pi$ can be in the MHz regime.

In certain implementations, the oscillating gradient at $\omega_g$, in combination with the detuned microwaves, gives rise to two spin-motion-coupling sideband interactions, occurring when $\delta = \omega_r \pm \omega_g$, respectively, and the bichromatic microwave pair combines to give an effective modulation of $\Omega_\mu$. In certain implementations, the ZZ gate utilizes a magnetic-field-sensitive qubit transition instead of magnetic-field-insensitive "clock" transitions as are typically used for their long coherence times. Certain implementations comprise storing quantum information in a clock qubit and transferring the state populations to a field-sensitive qubit only during times when an entangling gate is being carried out. Alternatively, in certain other implementations, microwave fields can be applied to field-sensitive transitions to create dressed-state clock qubits (see, e.g., Timoney 2011).

As described herein, the interaction picture Hamiltonian can be expressed as Eq. (27). By setting the conditions:

$$4\delta = (\omega_r - \omega_g) - j\Delta$$

$$8\delta = (\omega_r + \omega_g) - (j+1)\Delta, \qquad (32)$$

where j is an integer, and $\Delta = 2\pi/t_G$ is on the order of $\Omega_g$, the terms $\Box\, J_4$ and $\Box\, J_8$ become slowly varying in time with respect to all other terms in the sum. These terms therefore make the dominant contribution to the gate system dynamics, while the other terms that appear in Eq. (27) are significantly off-resonant, with contributions scaling as $(\Omega_g/\delta)^2$ (note that $\Omega_g \ll \delta$). In the laboratory frame, the conditions in Eqs. (32) are equivalent to setting $\delta$ and $\omega_g$ to drive both the $\omega_r - \omega_g$ and $\omega_r + \omega_g$ sidebands simultaneously, as shown in FIG. 1C.

Keeping only these near-resonant terms gives:

$$\hat{H}_I(t) \simeq \hbar \Omega_g \hat{S}_z \qquad (33)$$

$$\left\{ J_4\left(\frac{4\Omega_\mu}{\delta}\right)(\hat{a}e^{-ij\Delta t} + \hat{a}^\dagger e^{ij\Delta t}) + J_8\left(\frac{4\Omega_\mu}{\delta}\right)(\hat{a}e^{-i(j+1)\Delta t} + \hat{a}^\dagger e^{i(j+1)\Delta t}) \right\},$$

which resembles, but differs from, other disclosed forms of a motionally robust polychromatic gates (see, e.g., Webb 2018; Haddadfarshi 2016: *New J. Phys.* 18, 123007; Shapira 2018: *Phys. Rev. Lett.* 121, 180502) and will generate a gate with K loops by choosing:

$$\Delta = 4\Omega_g K^{1/2} \left\{ \frac{\left[J_4\left(\frac{4\Omega_\mu}{\delta}\right)\right]^2}{j} + \frac{\left[J_8\left(\frac{4\Omega_\mu}{\delta}\right)\right]^2}{j+1} \right\}^{1/2}. \qquad (34)$$

Since $J_4(4\Omega_\mu/\delta)$ and $J_8(4\Omega_\mu/\delta)$ are independent functions, the relative amplitudes of their effective tones can be optimized by setting the value of $\Omega_\mu/\delta$. For example, when $j=1$, the gate can be robust to gate duration errors when $J_8(4\Omega_\mu/\delta)/J_4(4\Omega_\mu/\delta)=-1$ or when $J_8(4\Omega_\mu/\delta)/J_4(4\Omega_\mu/\delta)=-2$. In certain implementations, these gates still exhibit sensitivity to time-varying qubit frequency shifts.

In certain implementations, the gate utilizes intrinsic dynamical decoupling (IDD) to reduce (e.g., eliminate) the sensitivity to time-varying qubit frequency shifts. As described herein, when the value of $4\Omega_\mu/\delta$ is set to one of the zeros of the $J_0$ Bessel function, the expression in Eq. (17) goes to zero and the qubit frequency shifts do not contribute to the dynamics. The off-resonant terms dropped from Eq. (17) all oscillate at integer multiples of $\delta$ (e.g., where $\epsilon$, $\omega_\epsilon \ll \delta$), their effect averages to zero. In certain implementations, $\delta$, $\omega_g$, and $\omega_r$ are selected such that (i) Eqs. (32) are met for a particular value of j, and (ii) $4\Omega_\mu/\delta \simeq 8.65$, such that the gate is operated at the third zero of $J_0(4\Omega_\mu/\delta)$ (e.g., the third IDD point) at which $J_8(4\Omega_\mu/\delta)/J_4(4\Omega_\mu/\delta) \simeq -1.22$ (see FIG. 5C), which can be referred to as the IDD-j gate.

Figure 5B:
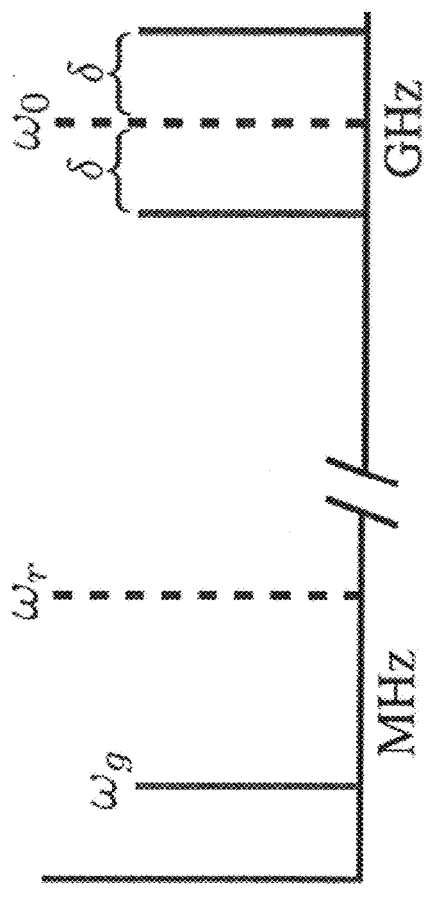
FIG. 5B is a plot of the motional phase space trajectories of two gates that are insensitive to qubit frequency shifts for a conventional single-tone gate (dashed line) and a motionally robust gate (solid line) in accordance with certain implementations described herein.
Figure 5C:
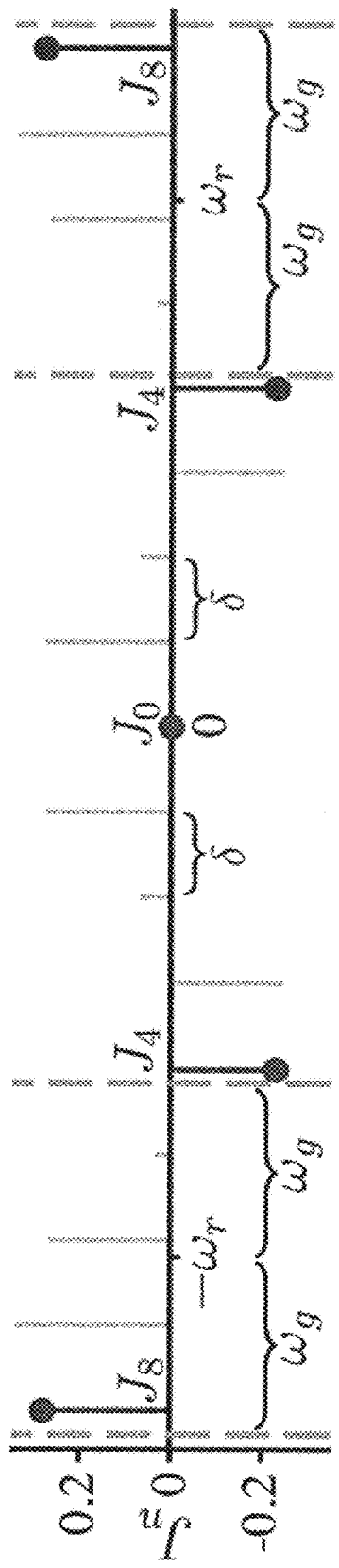
FIG. 5C is a plot of the amplitudes of Bessel functions $J_n$ as a function of frequency in the rotating frame of the qubit in accordance with certain implementations described herein.

FIG. 5B shows the phase space trajectory of an IDD-2 gate in accordance with certain implementations described herein in comparison to that of a single-tone gate corresponding to the $J_2$ resonance at the first IDD point (which can be referred to as IDD-single). While the phase space trajectories of IDD-single and IDD-1 gates are not completely centered on the origin, those of IDD-j gates for $j \geq 2$ in accordance with certain implementations described herein are centered on the origin, resulting in less time-averaged spin-motion entanglement, and consequently less impact of motional decoherence on gate fidelity. In the following numerical calculations with regard to IDD: $\Omega_g/2\pi=1$ kHz and $\omega_r/2\pi=6.5$ MHz. For the IDD-single gate, $\omega_g/2\pi=5$ MHz and for the IDD-j gates, $\omega_g \sim \omega_r/3$.

In addition to the IDD effect, the IDD-j gates of certain implementations can be made insensitive to static qubit frequency shifts. With an effective interaction of the form $\sigma_{z,1}\sigma_{z,2}$, the qubit frequency shifts commute with the ZZ gate operation. As a result, the effect of static qubit frequency shifts can be removed (when $\epsilon \ll \delta$) by performing a K=2 loop gate with an instantaneously applied qubit $\pi$ rotation in between loops (e.g., a Walsh modulation of index 1; see, e.g., Hayes 2012).

Figure 6A:
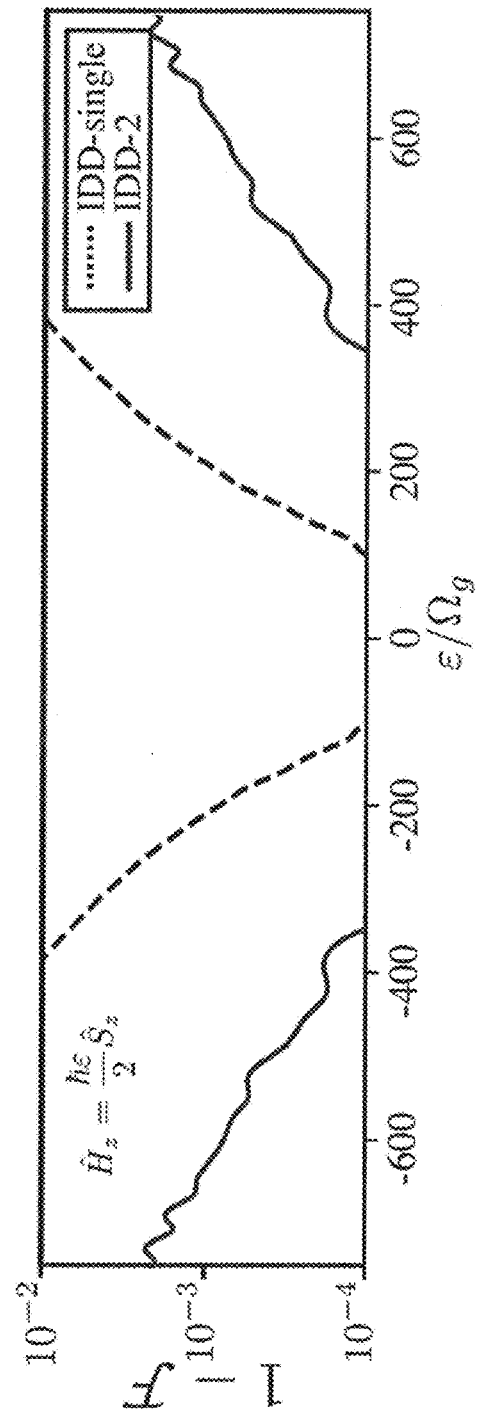
FIG. 6A is a plot of numerical simulations of the impact of static shifts $\varepsilon$ on the gate infidelity $1-\mathcal{F}$ in accordance with certain implementations described herein.

FIG. 6A shows numerical simulations (including all terms in Eq. (26)) of the impact of static shifts ε on the gate infidelity $1-\mathcal{F}$, which is below the $10^{-4}$ level for $\varepsilon \lesssim 300\Omega_g$, in accordance with certain implementations described herein. The dashed lines correspond to the IDD-single gate and the solid lines correspond to the IDD-2 gate with a gradient strength $\Omega_g$. The gate fidelity $\mathcal{F}$ can be defined as $\mathcal{F} \equiv \langle \Phi^+ | \hat{\rho}(t_G) | \Phi^+ \rangle$, where $|\Phi^+\rangle \equiv 1/\sqrt{2}(|\downarrow\downarrow\rangle) + i|\uparrow\uparrow\rangle)$ is the target qubit state, when starting in $|\downarrow\downarrow\rangle$ and performing global π/2 rotations perpendicular to z immediately before and after the gate. This technique breaks down as ε approaches δ, such that the off-resonant terms become non-negligible.

Figure 6B:
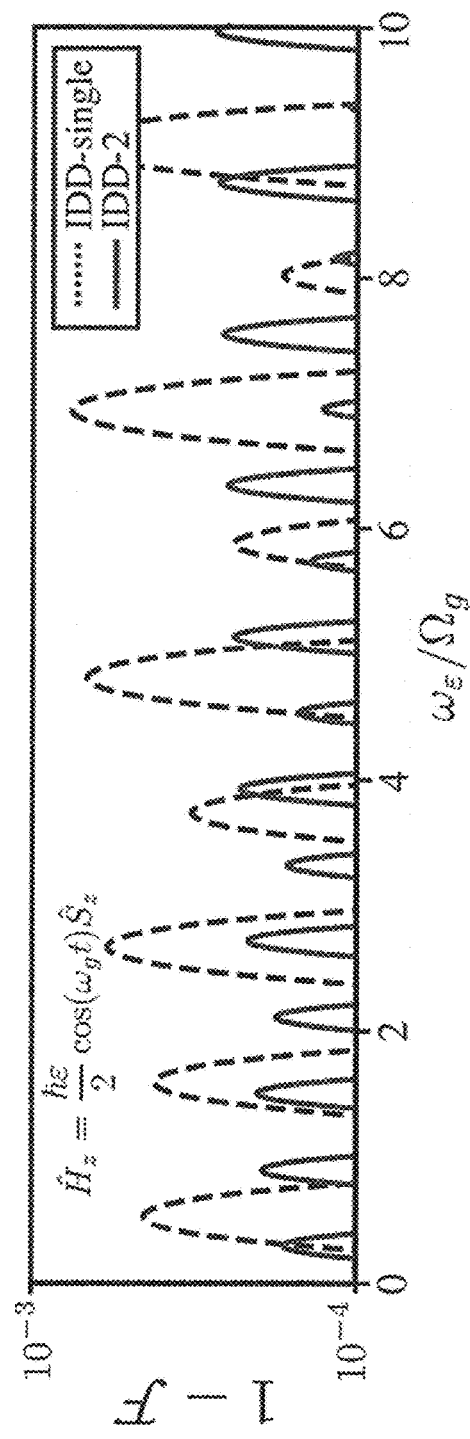
FIG. 6B is a plot of numerical simulations of the sensitivity of the gate infidelity $1-\mathcal{F}$ to oscillating qubit frequency shifts in accordance with certain implementations described herein.

FIG. 6B shows numerical simulations of the sensitivity of the gate infidelity $1-\mathcal{F}$ to oscillating qubit frequency shifts (plotted as a function $\omega_\varepsilon$, assuming a shift amplitude $\varepsilon = \Omega_g/5$) in accordance with certain implementations described herein. For $1-\mathcal{F} \ll 1$, the infidelity scales as $\varepsilon^2$. The numerical simulations shown in FIGS. 6A and 6B use a 20 μs Blackman envelope to shape the rising and falling edges of the gradient pulses and the microwave pulses. For example, the microwave pair can be turned on first, and the gradient can be ramped up after the microwaves reach steady state, and ramped down in the reverse order at the end of the pulses. The gate speed is linear in the gradient strength, while it depends on the microwave amplitude as the argument of the two Bessel functions $J_4$ and $J_8$ (see Eq. (33)), which can cause complicated undesired dynamics during the microwave ramp if the gradient is already present. The errors seen in FIG. 6B occur during the microwave rise and fall times, when $\Omega_\mu$ is not at the IDD point, such that the qubits are vulnerable to frequency fluctuations of the form in $\hat{H}_z(t)$. Qubit shifts that oscillate at or near nδ (for integer n) appear in the bichromatic interaction picture as static error terms $\propto \hat{S}_z$ (for even n) or $\propto \hat{S}_y$ (for odd n). Experimentally, qubit frequency fluctuations near nδ can arise from residual magnetic fields at $\omega_g$ from the currents generating the gradient. Choosing the $J_4$ and $J_8$ resonances to implement the gate makes n even, and so the resulting errors are $\propto \hat{S}_z$ and can be removed as described herein.

Figure 7A:
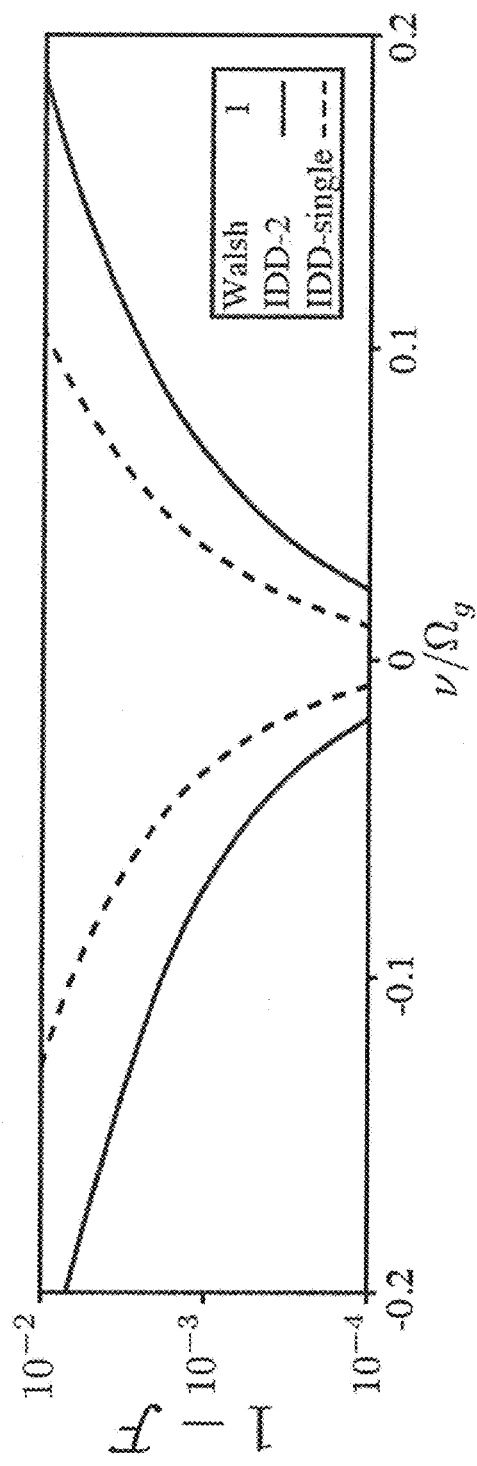
FIG. 7A is a logarithmic plot of the gate infidelity $1-\mathcal{F}$ as a function of the motional frequency offset $v$ for both of the qubit-frequency shift-resistant gates of FIGS. 6A and 6B, with a fixed gradient $\Omega_g$, in accordance with certain implementations described herein.

In certain implementations, gates with multiple blue and red sideband pairs have reduced sensitivity to motional frequency offsets. For example, an IDD-j gate is a linear superposition of a K=j and a K=j+1 loop gate, each with amplitudes of opposite signs. A motional frequency offset ν shifts the secular frequency such that $\omega_r \to \omega_r + \nu$, resulting in a residual displacement in phase space at the end of the gate. With nonzero ν, the superposed gates experience opposite displacements in phase space which coherently cancel each other. FIG. 7A is a logarithmic plot of the gate infidelity $1-\mathcal{F}$ as a function of the motional frequency offset ν for both of the qubit-frequency shift-resistant gates of FIGS. 6A and 6B, with a fixed gradient $\Omega_g$, in accordance with certain implementations described herein. As shown in FIG. 7A, the IDD-2 gate has a lower sensitivity to ν than does the IDD-single gate.

Figure 7B:
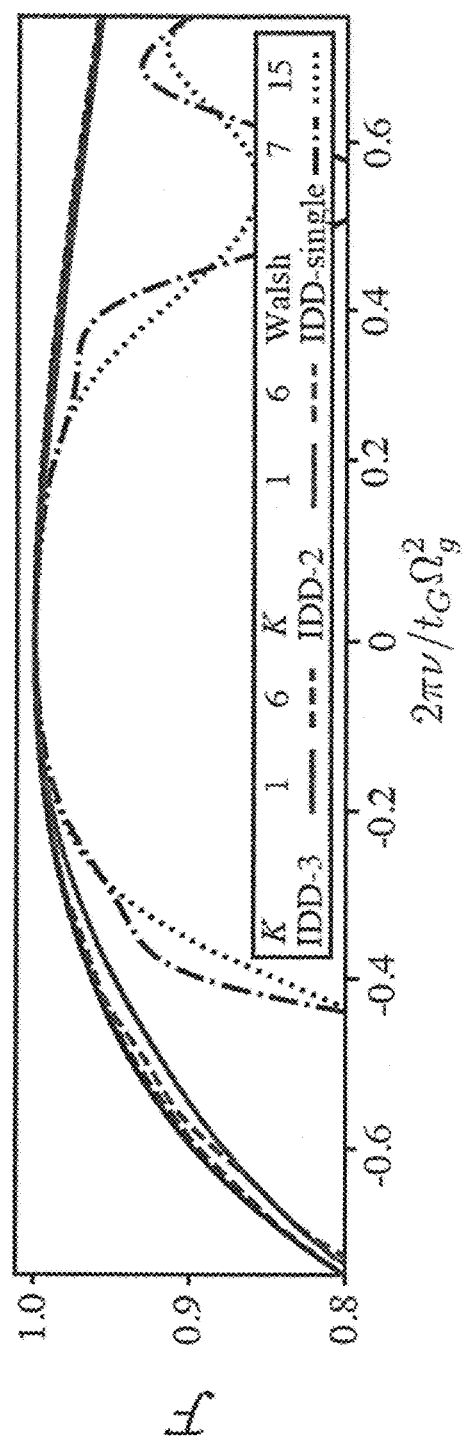
FIG. 7B is a plot of the Bell state infidelity for various intrinsically dynamically decoupled gates in accordance with certain implementations described herein.

FIG. 7B plots the Bell state infidelity for various IDD gates in accordance with certain implementations described herein. FIG. 7B shows the IDD-single gate performed with Walsh modulation of index 3 or 4 (K=8 and K=16, respectively) and the IDD-2 gate and the IDD-3 gate with K=1 or K=6, plotted against a dimensionless motional offset $\nu/\Omega_g$ normalized by a dimensionless gate duration $t_G \Omega_g/2\pi$. With this normalization, the different gates fall on approximately the same curve of sensitivity to motional frequency offsets, as do IDD-single gates for small values of $(\nu/\Omega_g)/(t_G\Omega_g/2\pi)$.

As the gate-time-normalized motional frequency offset becomes larger, the IDD-j gates have higher fidelity than single tone gates following Walsh sequences, as shown in FIG. 7B. FIG. 7B shows that the coherent error cancellation can provide reduced sensitivity to ν by increasing either the number of loops K or the order j of the gate. The infidelity $1-\mathcal{F}$ due to an offset ν can remain constant for an increased ν if $t_G$ is also increased proportionally, whether the increased $t_G$ is associated with more loops K or larger values of j.

Figure 8A:
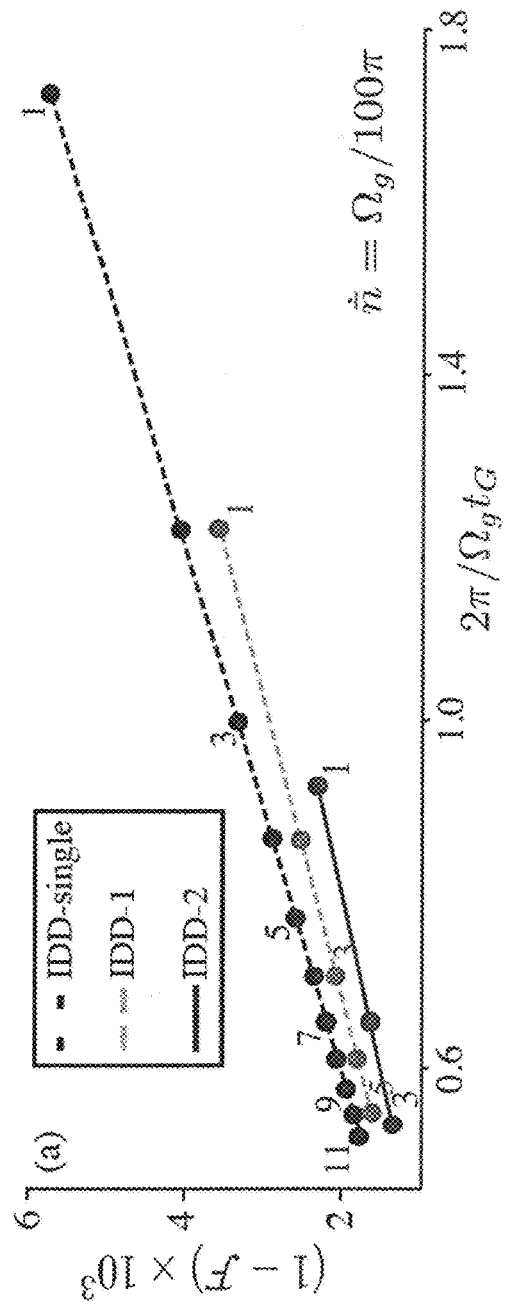
FIG. 8A is a plot of the gate infidelity due to motional heating versus normalized gate speed $2\pi\Omega_g t_G$ in accordance with certain implementations described herein.
Figure 8B:
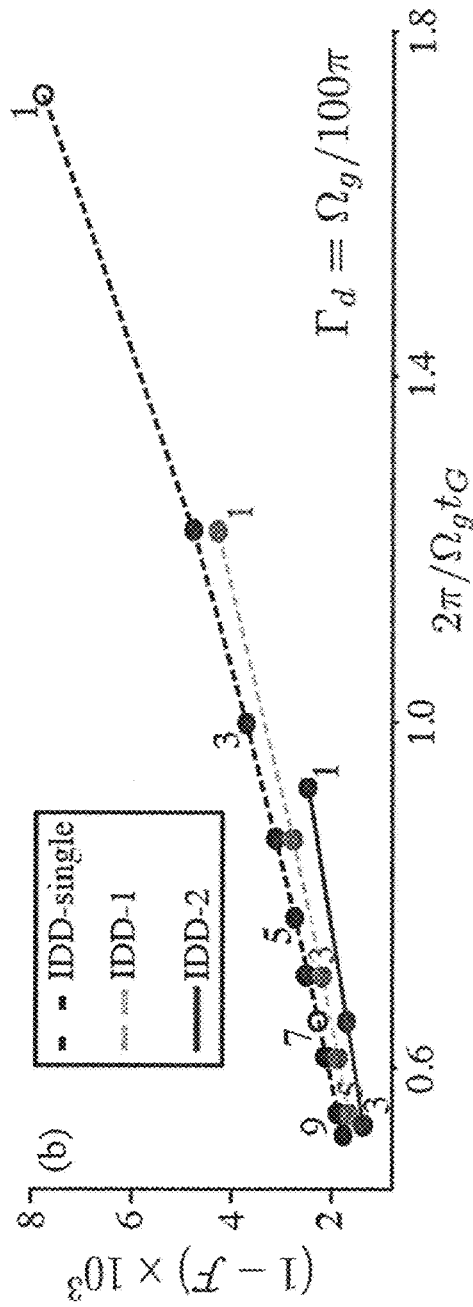
FIG. 8B is a plot of the same calculations as FIG. 8A, but for motional dephasing instead of motional heating, assuming a motional dephasing rate of $\Gamma_d=\Omega_g/100\pi$, in accordance with certain implementations described herein.

FIG. 8A is a plot of the gate infidelity due to motional heating versus normalized gate speed $2\pi\Omega_g t_G$ in accordance with certain implementations described herein. Point labels indicate the number of phase space loops K. For a given gradient strength $\Omega_g$ and heating rate $\bar{n}=\Omega_g/100\pi$, the error of a gate scales with $1/t_G$. For a given $t_G$, the IDD-2 gate (solid line) and the IDD-1 gate (light dashed line) outperform the IDD-single gate (dark dashed line). Higher-order IDD-j gates for j≥3 are similar to the IDD-2 gate. FIG. 8B is a plot of the same calculations, but for motional dephasing instead of motional heating, assuming a motional dephasing rate of $\Gamma_d=\Omega_g/100\pi$, in accordance with certain implementations described herein. These decoherence mechanisms can be treated as Markovian, using a Lindblad formalism. For these calculations, Eq. (33) was used to calculate the infidelity, which gives the same motional decoherence effect as the full integration of Eq. (26).

FIGS. 8A and 8B show the increased robustness to heating and motional dephasing of the IDD-j gates in accordance with certain implementations described herein. In certain implementations, geometric phase gates can be made less sensitive to motional heating by performing more phase space loops, with $1-\mathcal{F}$ scaling $\propto 1/t_G$. Both calculations of FIGS. 8A and 8B show that, while better than the IDD-single gate, the IDD-1 gate is not as robust as is the IDD-2 gate, which can be understood because the IDD-1 trajectory is not centered on the origin of phase space. For j>2, however, there is not a significant improvement of the fidelity versus $t_G$ relative to j=2, because the phase space trajectory of the IDD-2 gate is already centered on the origin, thus saturating improvement to the time-averaged spin-motion entanglement.

Example Surface Electrode Trapped-Ion Quantum Logic Gate

Figure 9:
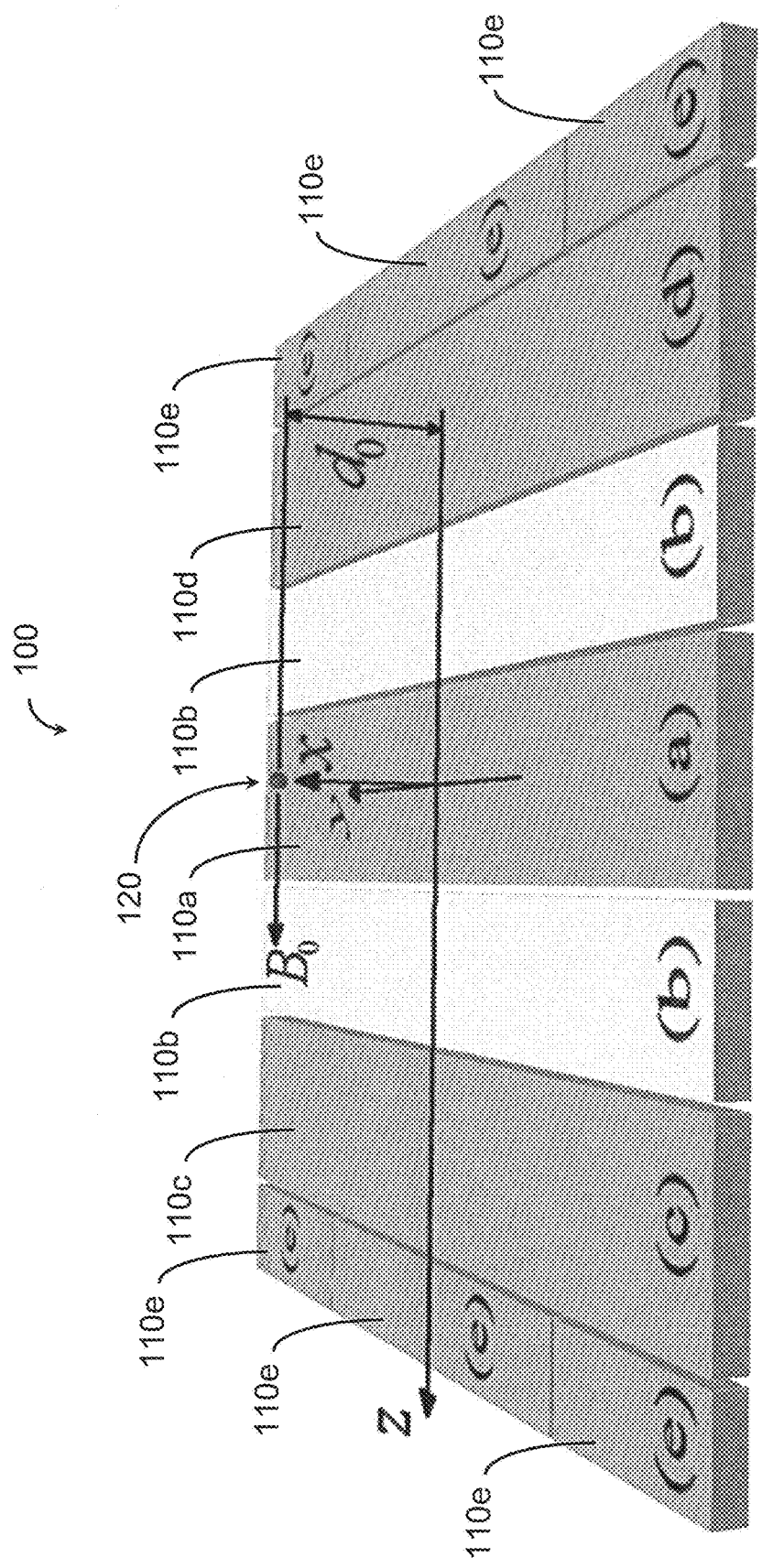
FIG. 9 schematically illustrates an example surface electrode configuration for an example trapped-ion quantum logic gate compatible with certain implementations described herein.

FIG. 9 schematically illustrates an example surface electrode configuration (developed and disclosed by Ospelkaus 2008) for an example trapped-ion quantum logic gate 100 compatible with certain implementations described herein. In certain implementations, the gate 100 of FIG. 9 is configured for operation as a $\hat{\sigma}_\phi \otimes \hat{\sigma}_\phi$ gate (e.g., a $\hat{\sigma}_y \otimes \hat{\sigma}_y$ gate or "YY gate"), while in certain other implementations, the gate 100 of FIG. 9 is configured for operation as provides a $\hat{\sigma}_z \otimes \hat{\sigma}_z$ gate (e.g., a "ZZ gate").

The example gate 100 of FIG. 9 comprises a plurality of electrodes 110 at a surface (e.g., in the yz plane) of a substrate (not shown) having a surface normal generally along the x-direction. Each of the electrodes 110 extends generally along the y-direction, as shown in FIG. 9. The plurality of electrodes 110 comprises a first electrode 110a, two second electrodes 110b, a third electrode 110c, a fourth electrode 110d, and a plurality of segmented fifth electrodes 110e. The first electrode 110a is between the two second electrodes, and the first and second electrodes 110a, 110b are between the third electrode 110c and the fourth electrode 110d. The first, second, third, and fourth electrodes 110a, 110b, 110c, 110d are between a first set of the fifth electrodes 110e and a second set of the fifth electrodes 110e.

In certain implementations, a first potential that is static (e.g., constant) is applied to the first electrode 110a, a second potential that oscillates at a radio frequency (e.g., rf potential) is applied to each of the two second electrodes 110b, and third, fourth, and fifth potentials that are static (e.g., constant) are applied to the third, fourth, and fifth electrodes 110c, 110d, 110e, respectively, such that the third, fourth, and fifth electrodes 110c, 110d, 110e provide confinement along the y-direction. The oscillating currents in the first, third, and fourth electrodes 110a, 110c, 110d can be used to implement single-qubit rotations and entangling gates. In certain implementations, the electrodes 110 have a uniform distribution of current in the surface, and induced currents in neighboring trap electrodes 110, which can alter the magnetic fields and their gradients at the position of the ion 120, are reduced (e.g., minimized).

In certain implementations, at least one ion 120 is trapped (e.g., at an rf pseudopotential null line) at a distance $d_0$ above the trap plane (e.g., the yz plane). For example, the at least one ion 120 can comprise one ion 120 (e.g., $^9$Be$^+$) having mass m or a plurality of N ions 120 (e.g., two, three, four, or more $^9$Be$^+$ ions), each ion 120 having mass m, and the plurality of N ions 120 generally aligned with one another along the y direction. Examples of other ions that can be used include, but are not limited to, Mg$^+$, Ca$^+$, Sr$^+$, Ba$^+$, Zn$^+$, Cd$^+$, Hg$^+$, and Yb$^+$. Each ion 120 can comprise two internal states with $|\uparrow\rangle$ and $|\downarrow\rangle$ that compose a qubit with a transition frequency $\omega_0$. The z direction can be the quantization axis, provided by a static magnetic field $B_0 \vec{e}_z$, with the n$^{th}$ ion 120 having a displacement $q_n$ (along the x or z directions) relative to its equilibrium position ($q_n$=0).

In certain implementations, at least some of the plurality of electrodes 110 can have widths along the z-direction that are configured such that antiparallel currents $I(t)=\tilde{I} \cos(\omega t+\varphi)$ through the third and fourth electrodes 110c, 110d provide a magnetic field (e.g., $\overline{B}_x = 1.5 \times 10^{-7}$ I(t)/$d_0$ T at the ion 120 to implement rotations, where I and $d_0$ are expressed in amperes and meters, respectively). For example, the first, third, and fourth electrodes 110a, 110c, 110d have a width along the z-direction that is (5/4)$d_0$ and the second electrodes can have a width along the z-direction that is (39/40)$d_0$.

In certain implementations, for $d_0$=30 μm and using a field-independent $^9$Be$^+$ ion 120 as the qubit, ($B_0$=12 mT with $|\uparrow\rangle$=|F=1, $m_F$=1⟩ and $|\downarrow\rangle$=|F=2, $m_F$=0⟩, $\mu_{x\uparrow\downarrow}$=0.48$\mu_B$, where $\mu_B$ is the Bohr magneton), a carrier π pulse can be generated in 1 μs with $\tilde{I}$=15 mA. For multiqubit gates, an oscillating current I(t) can be applied through the first electrode 110a to produce a field $B_z$(t) at the ion 120. Two currents at −2.5 I(t) can be applied through the third and fourth electrodes 110c, 110d to produce a magnetic field −$B_z$(t) at the ion 120, thereby nulling the magnetic field while all three currents provide field gradients $\partial B_x(t)/\partial z = \partial B_z(t)/\partial x = 2.5 \times 10^{-7}$ I(t)/$d_0^2$ T/m for motional-state excitation and multi-qubit gates. For example, $\hat{\sigma}_\varphi \otimes \hat{\sigma}_\varphi$ gate can be implemented with the first-order field-insensitive $^9$Be$^+$ ion 120 as the qubit and $d_0$=30 μm, with a radial z "rocking" or center-of-mass (COM) mode with $\omega_j$=2π×5 MHz in τ=20 μs with $\tilde{I}$=1.7 A [τ∝(m$\omega_j$)$^{1/2}$/($\partial B_x/\partial z$)]. For another example, a $\hat{\sigma}_z \otimes \hat{\sigma}_z$ gate can be implemented with the first-order field-insensitive $^9$Be$^+$ ion 120 as the qubit and the states $|\uparrow\rangle$=|F=2, $m_F$=−2⟩ and $|\downarrow\rangle$=|F=2, $m_F$=0⟩ ($\mu_{z\uparrow\uparrow}$=−1.0$\mu_B$; $\mu_{z\downarrow\downarrow}$=0.26$\mu_B$), reached from the field-independent qubit manifold with one microwave pulse. For a radial x rocking or COM mode, the $\hat{\sigma}_z \otimes \hat{\sigma}_z$ gate can be realized in the same time with $\tilde{I}$=1.3 A.

In certain implementations, an entangling gate comprises at least one ion 120, a magnetic field gradient, and two microwave fields. The internal states of the at least one ion 120 are coupled via a motional mode having a frequency $\omega_r$, and all other motional modes are sufficiently detuned from $\omega_r$ such that they do not coupled to the spins of the at least one ion 120. The magnetic field gradient is a gradient, along the motional mode, of a component (e.g., along the x, y, or z direction) of a magnetic field, and has a time dependence f(t). For example, f(t) can be constant or can be sinusoidally oscillating. Each of the two microwave fields has a respective frequency that is detuned from the qubit transition frequency $\omega_0$ of the at least one ion 120 by a frequency difference δ (e.g., $\omega_1$=$\omega_0$+δ and $\omega_2$=$\omega_0$−δ), with δ≪$\omega_0$ (e.g., δ/$\omega_0$ is less than 0.05; δ/$\omega_0$ is less than 0.01). The at least one ion 120 has a Rabi frequency $\Omega_\mu$ corresponding to fluctuations in the populations of the two states of the at least one ion 120 due to the microwave fields. The at least one ion 120 also has a Rabi frequency $\Omega_g$ corresponding to fluctuations in the populations of the two states of the at least one ion 120 due to the magnetic field gradient.

In certain implementations, the values of $\Omega_g$ and δ and are selected such that the quantity $\Omega_g$/δ is small (e.g., in a range between zero and 5×10$^{-2}$; in a range between zero and 1×10$^{-2}$; in a range between zero and 1×10$^{-3}$). For example, $\Omega_g$ can be on the order of kHz (e.g., $\Omega_g$/2π is in a range of 0.1 kHz to 10 kHz) and δ can be on the order of MHz or GHz (e.g., δ/2π is in a range of 0.1 MHz to 10 GHz). In certain implementations, the values of $\Omega_\mu$ and δ and are selected such that the quantity 4$\Omega_\mu$/δ is close to a zero of the $J_0$ Bessel function. For example, the quantity 4$\Omega_\mu$/δ can in a range within 10% of the first zero of the $J_0$ Bessel function (2.405), a range within 10% of the second zero of the $J_0$ Bessel function (5.520), or a range within 10% of the third zero of the $J_0$ Bessel function (8.654). In certain implementations, the values of $\Omega_\mu$ and δ and are selected such that the quantity 4$\Omega_\mu$/δ is close to (e.g., within 10%) of the value at which an absolute value of the $J_n$ Bessel function, where n≥1, is at a maximum. In certain implementations, the values of $\Omega_\mu$ and δ are selected such that $J_8(4\Omega_\mu/\delta)/J_4(4\Omega_\mu/\delta)$ is close to (e.g., within 10%) of −1, −1.22, or −2.

Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. A method of operating a trapped-ion quantum logic gate, the method comprising:
    providing a trapped-ion quantum logic gate, the gate comprising:
        at least one ion having two internal states and forming a qubit having a qubit transition frequency $\omega_0$;
        a magnetic field gradient; and
        two microwave fields, each having a respective frequency that is detuned from the qubit transition frequency $\omega_0$ by frequency difference $\delta$, the at least one ion having a Rabi frequency $\Omega_\mu$ due to the two microwave fields and a Rabi frequency $\Omega_g$ due to the magnetic field gradient; and
    applying the magnetic field gradient and the two microwave fields to the at least one ion such that a quantity $\Omega_g/\delta$ is in a range between zero and $5\times10^{-2}$.

2. The method of claim 1, wherein the two internal states of the at least one ion are coupled via a motional mode having a frequency $\Omega_r$, and the magnetic field gradient comprises a gradient, along the motional mode, of a component of a magnetic field, and has a time dependence f(t).

3. The method of claim 2, wherein the time dependence f(t) is constant.

4. The method of claim 2, wherein the time dependence f(t) comprises a sinusoidal oscillation.

5. The method of claim 1, wherein $\delta/\omega_0$ is less than 0.05.

6. The method of claim 1, wherein $\delta/\omega_0$ is less than 0.01.

7. The method of claim 1, wherein $\Omega_g/2\pi$ is in a range of 0.1 kHz to 10 kHz and $\delta/2\pi$ is in a range of 0.1 MHz to 10 GHz.

8. The method of claim 7, further comprising applying the magnetic field gradient and the two microwave fields to the at least one ion such the at least one ion experiences intrinsic dynamical decoupling.

9. The method of claim 8, wherein a quantity $4\Omega_\mu/\delta$ is within 10% of a zero of a $J_0$ Bessel function.

10. The method of claim 8, wherein the quantity $4\Omega_\mu/\delta$ is within 10% of the value at which an absolute value of the $J_n$ Bessel function, where n≥1, is at a maximum.

11. The method of claim 8, wherein the values of $\Omega_\mu$ and $\delta$ are selected such that $J_8(4\Omega_\mu/\delta)/J_4(4\Omega_\mu/\delta)$ is within 10% of −1, −1.22, or −2.

12. A trapped-ion quantum logic gate comprising:
    at least one ion having two internal states and forming a qubit having a qubit transition frequency $\omega_0$;
    a magnetic field gradient; and
    two microwave fields, each having a respective frequency that is detuned from the qubit transition frequency $\omega_0$ by frequency difference $\delta$, the at least one ion having a Rabi frequency $\Omega_\mu$ due to the two microwave fields and a Rabi frequency $\Omega_g$ due to the magnetic field gradient, the magnetic field gradient and the two microwave fields configured such that a quantity $\Omega_g/\delta$ is in a range between zero and $5\times10^{-2}$.

13. The trapped-ion quantum logic gate of claim 12, wherein the gate comprises a $\hat{\sigma}_\phi \otimes \hat{\sigma}_\phi$ gate.

14. The trapped-ion quantum logic gate of claim 12, wherein the gate comprises a $\hat{\sigma}_z \otimes \hat{\sigma}_z$ gate.

15. The trapped-ion quantum logic gate of claim 12, further comprising a surface electrode trap in which the at least one ion is confined, wherein the two internal states of the at least one ion are coupled via a motional mode having a frequency $\omega_r$, and the magnetic field gradient comprises a gradient, along the motional mode, of a component of a magnetic field, and has a time dependence $f(t)=\cos(\omega_g t)$, the at least one ion having resonances when $\delta$ is within 10% of an integer multiple of $|\omega_r \pm \omega_g|$.

16. The trapped-ion quantum logic gate of claim 15, wherein $\delta$ is within 10% of $(\omega_r-\omega_g)$, and the gate comprises a $\hat{\sigma}_\phi \otimes \hat{\sigma}_\phi$ gate with a Rabi frequency equal to $\Omega_g J_1(4\Omega_\mu/\delta)$, where $J_1$ is the first Bessel function.

17. The trapped-ion quantum logic gate of claim 15, wherein $\delta$ is within 10% of $|\omega_r-\omega_g|/2$, and the gate comprises a $\hat{\sigma}_z \otimes \hat{\sigma}_z$ gate with a Rabi frequency equal to $\Omega_g J_2(4\Omega_\mu/\delta)$, where $J_2$ is the second Bessel function.

18. The trapped-ion quantum logic gate of claim 15, wherein the values of $\Omega_\mu$ and $\delta$ and are selected such that the quantity $4\Omega_\mu/\delta$ is in a range within 10% of the first zero of the $J_0$ Bessel function (2.405), a range within 10% of the second zero of the $J_0$ Bessel function (5.520), or a range within 10% of the third zero of the $J_0$ Bessel function (8.654).

19. The trapped-ion quantum logic gate of claim 12, wherein the values of $\Omega_\mu$ and $\delta$ are selected such that $J_8(4\Omega_\mu/\delta)/J_4(4\Omega_\mu/\delta)$ is within 10% of −1, −1.22, or −2.

* * * * *